US012576975B1

(12) United States Patent
Page

(10) Patent No.: US 12,576,975 B1
(45) Date of Patent: Mar. 17, 2026

(54) METHOD, SYSTEM, AND APPARATUS FOR A PARACHUTE

(71) Applicant: D'Angelo Technologies, LLC, Beavercreek, OH (US)

(72) Inventor: Shawn D Page, Columbus, OH (US)

( * ) Notice: Subject to any disclaimer, the term of this patent is extended or adjusted under 35 U.S.C. 154(b) by 0 days.

(21) Appl. No.: 18/393,626

(22) Filed: Dec. 21, 2023

Related U.S. Application Data

(60) Provisional application No. 63/435,201, filed on Dec. 23, 2022.

(51) Int. Cl.
B64D 17/02 (2006.01)

(52) U.S. Cl.
CPC .................................. B64D 17/025 (2013.01)

(58) Field of Classification Search
CPC ....... B64D 17/02; B64D 17/025; B64D 17/22
See application file for complete search history.

(56) References Cited

U.S. PATENT DOCUMENTS

| | | | | |
|---|---|---|---|---|
| 3,480,238 | A * | 11/1969 | Barish | B64D 17/025 244/145 |
| 3,749,337 | A * | 7/1973 | Jalbert | B64D 17/025 244/145 |
| 4,705,238 | A * | 11/1987 | Gargano | B64D 17/025 244/145 |
| 4,846,424 | A * | 7/1989 | Prouty | A63H 27/08 244/152 |
| 4,930,728 | A * | 6/1990 | Wittington | B64D 17/025 244/145 |
| 6,769,649 | B2 * | 8/2004 | Preston | B64D 17/025 244/145 |
| 10,647,435 | B2 * | 5/2020 | Dunker | B64D 17/34 |
| 2002/0172792 | A1 * | 11/2002 | Jarvis | B29C 66/91411 156/227 |
| 2005/0077430 | A1 * | 4/2005 | Preston | B29C 70/30 244/145 |

FOREIGN PATENT DOCUMENTS

FR            2636597 A1 * 3/1990

* cited by examiner

*Primary Examiner* — Joshua D Huson
*Assistant Examiner* — Peter A Taraschi

(57)            ABSTRACT

In a first embodiment, a parachute comprising a top portion of a ram-air parachute and a bottom portion of a ram-air parachute, wherein the bottom portion extends less than ⅓ the length of the top portion. In a second embodiment, a parachute comprising a composite fabric. In a third embodiment, an air deployable gliding surface parachute comprising a top surface; where the top surface forms an airfoil, ribs; where the ribs run from the front of the top surface to the back of the top surface and are substantially parallel to each other rib and flares, where the flares are substantially parallel to each other flare; wherein the air deployable gliding surface parachute does not have a bottom portion.

12 Claims, 20 Drawing Sheets

TOP SURFACE
130

ONE CELL
120

9 CELL RAM-AIR
PARACHUTE CANOPY
110

BOTTOM SURFACE
140

RIB
150

AIR INLET
160

9 CELL RAM-AIR
PARACHUTE CANOPY
210

UNDERSIDE OF
CANOPY;
"BOTTOM SURFACE"
220

SUSPENSION LINES
230

BOTTOM SURFACE
SEAMS
310

BOTTOM SURFACE APPLICATION

TOP SURFACE
SEAMS
320

TOP SURFACE APPLICATION

UNLOADED RIB
SEAMS
330

UNLOADED RIB

9 CELL RAM-AIR
PARACHUTE
CANOPY
410

SUSPENSION
LINES
420

SLIDER
430

FLARES
(TRIANGULAR SHAPES)
540

RIB
545

CELL
547

WINGTIP
520

WINGTIP
520

HYBRID SINGLE-SURFACE
CANOPY NOSE
510

CROSSPORTS
(OVAL SHAPES)
530

WINGTIP
620

FLARES FOR LINE
ATTACHMENT
640

LINES
645

BACK APPROXIMATE 2/3
OF PARACHUTE CANOPY
670

SLIDER
650

AIRFOIL
680

CROSSPORT (OVAL)
630

HYBRID SINGLE-SURFACE
CANOPY NOSE
610

CANOPY CELLS
675

FRONT APPROXIMATE 1/3
OF PARACHUTE CANOPY
660

WINGTIP
620

MESH EXTENSIONS 730

SLIDER WITH SIDE EXTENSIONS 710

GROMMETS - TEN TOTAL 720

WINGTIP
SUPPORT
810

RIPSTOP
NYLON
FABRIC
820

BONDED SEAMS
1060

WINGTIP CELLS ARE
FULLY RAM-AIR
1020

LINE ATTACHMENT
POINTS
1050

SUSPENSION LINES
1070

HYBRID SINGLE-SURFACE CANOPY;
MADE ENTIRELY OF BONDED
COMPOSITE MATERIAL
1010

WINGTIP CELLS ARE
FULLY RAM-AIR
1020

SLIDER NOT FULLY
DESCENDED
1030

PAYLOAD OR PERSON
1040

NOSE AIR INLETS 1110

WINGTIP CELLS ARE FULLY RAM-AIR 1120

METHOD, SYSTEM, AND APPARATUS FOR A PARACHUTE

CROSS-REFERENCE TO RELATED APPLICATION

This application claims priority under 35 U.S.C. § 119 (e) to U.S. Provisional Patent Application No. 64/435,201 entitled "Method, System, and Apparatus for Parachute", filed on Dec. 23, 2022 the contents of which are incorporated herein in their entirety for all purposes.

BACKGROUND

A parachute can help slow cargo falling to the ground

SUMMARY

A parachute comprising a top portion of a ram-air parachute and a bottom portion of a ram-air parachute, wherein the bottom portion extends approximately ⅓ the length of the top portion.

Figure 11:
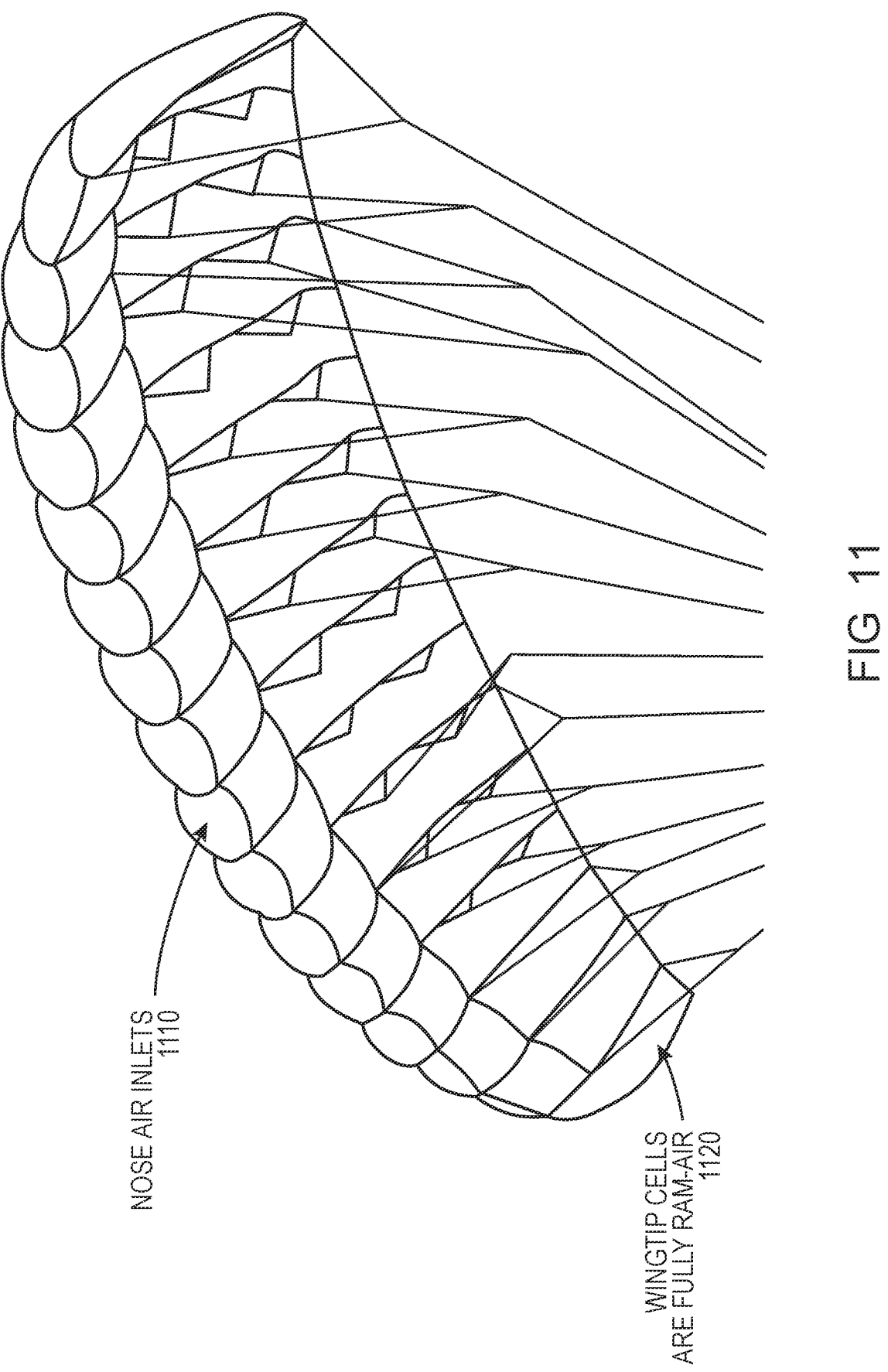
Figure 12:
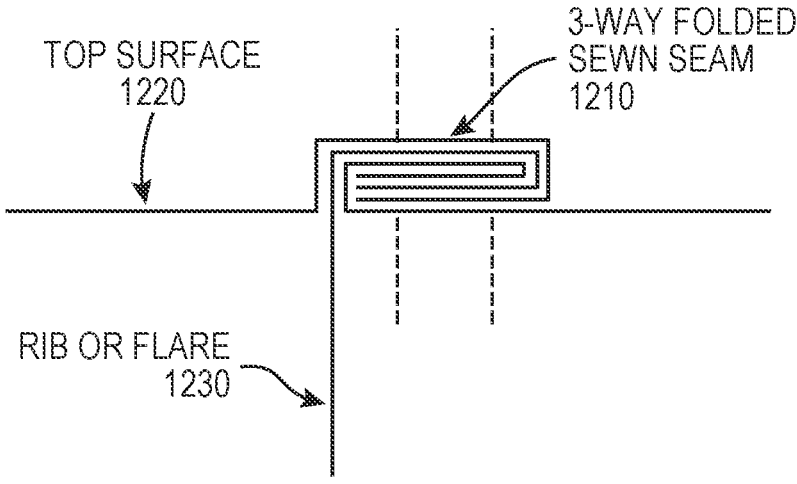
Figure 13A:
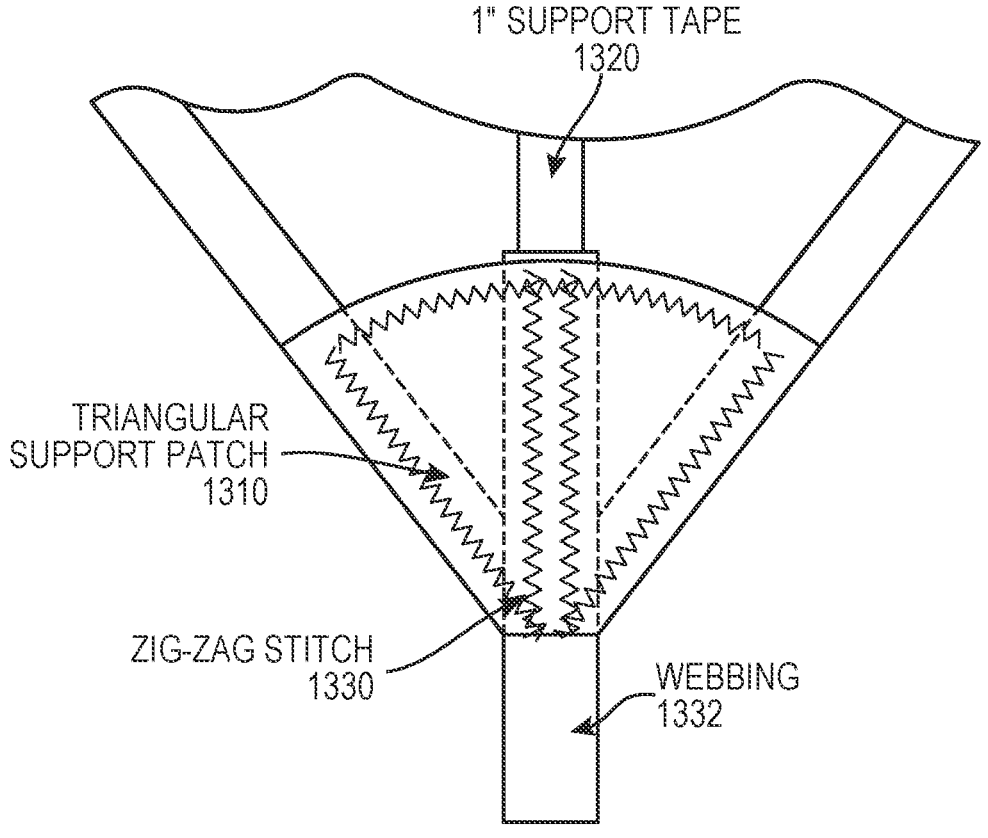
Figure 13B:
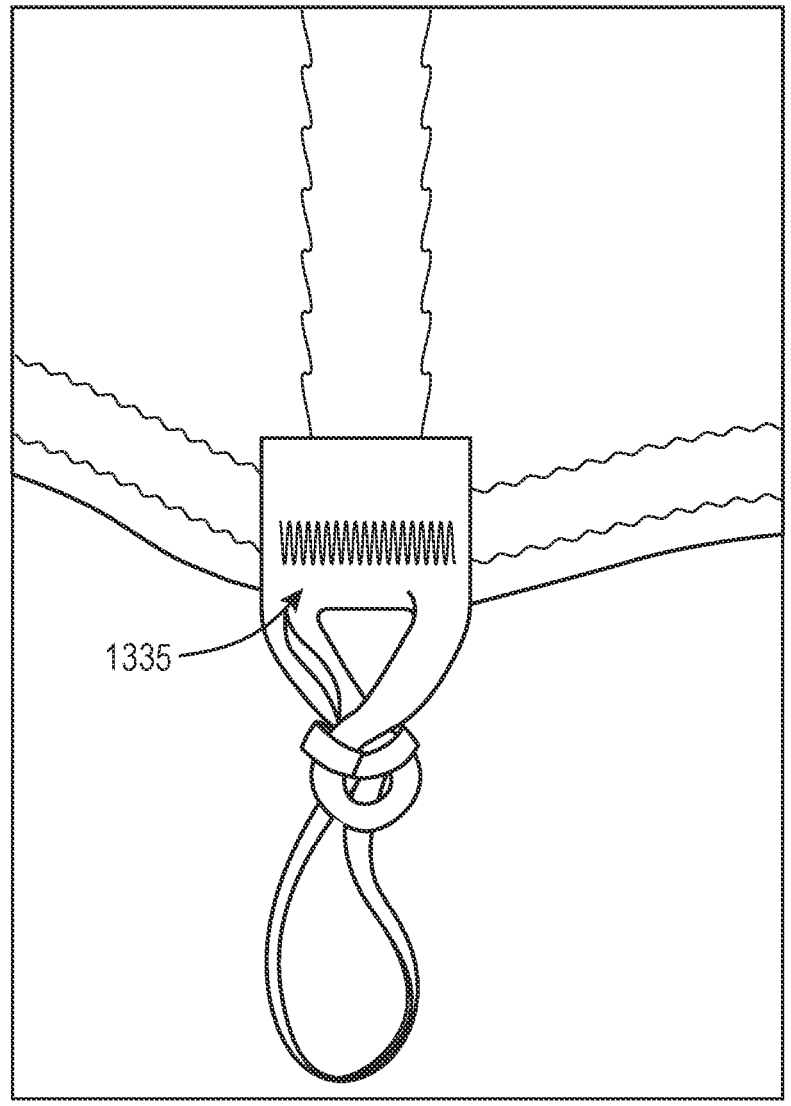
Figure 13C:
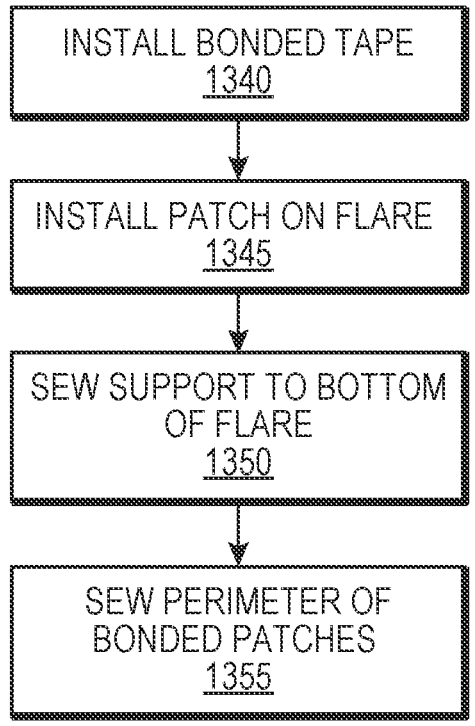
Figure 14:
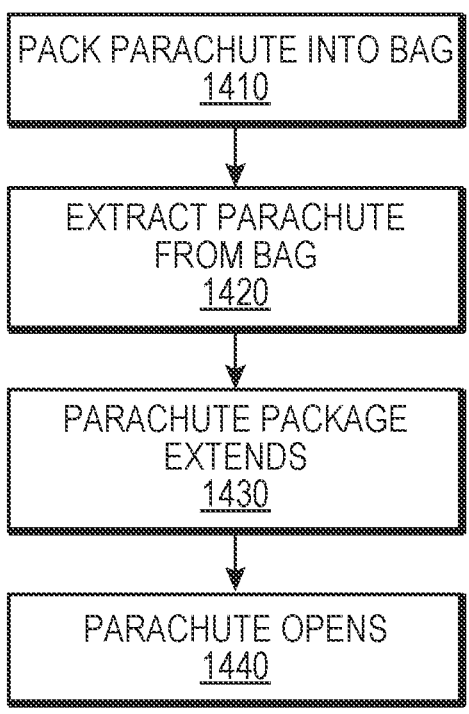
Figures 15A, 15B, 15C, 15D:
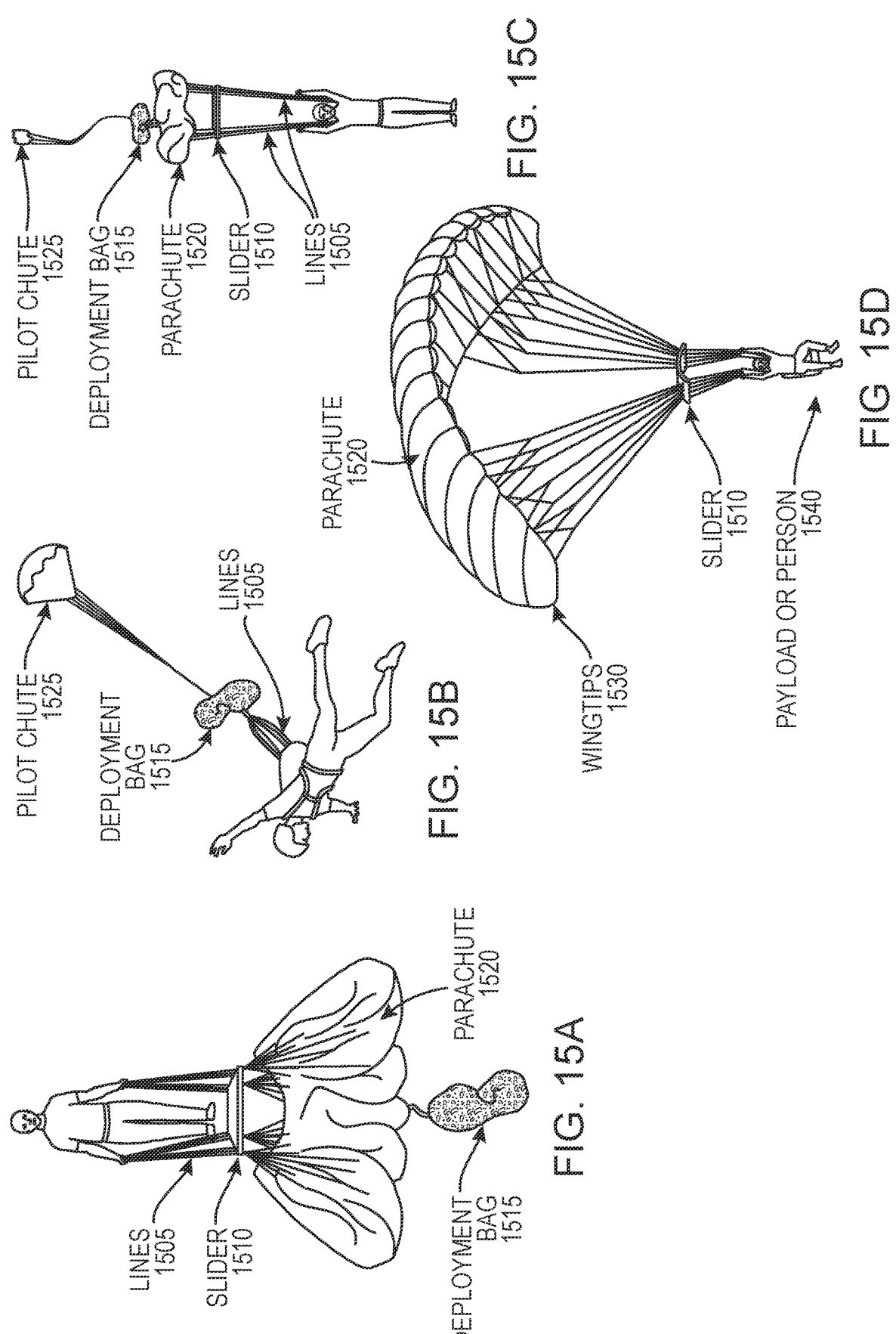
Figure 16:
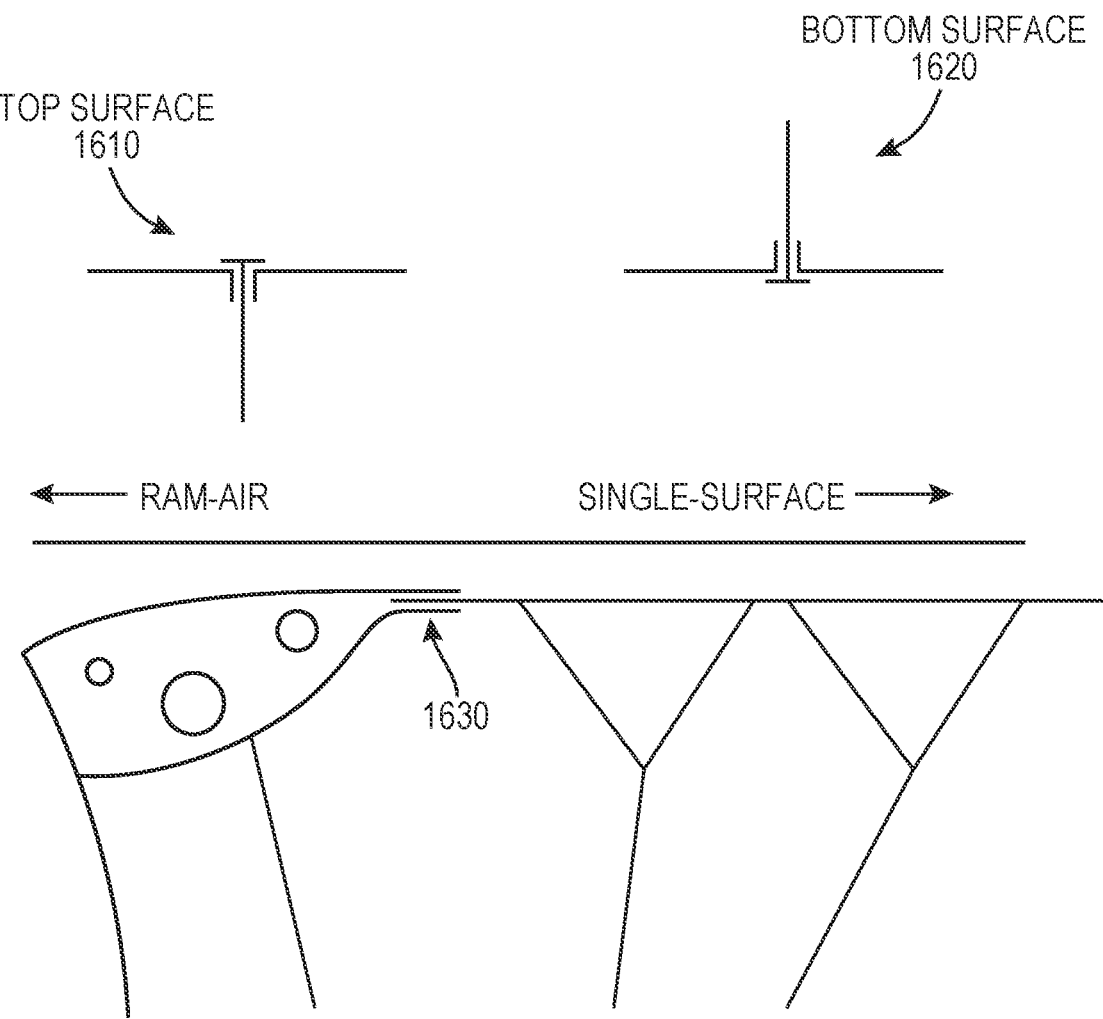
Figure 17:
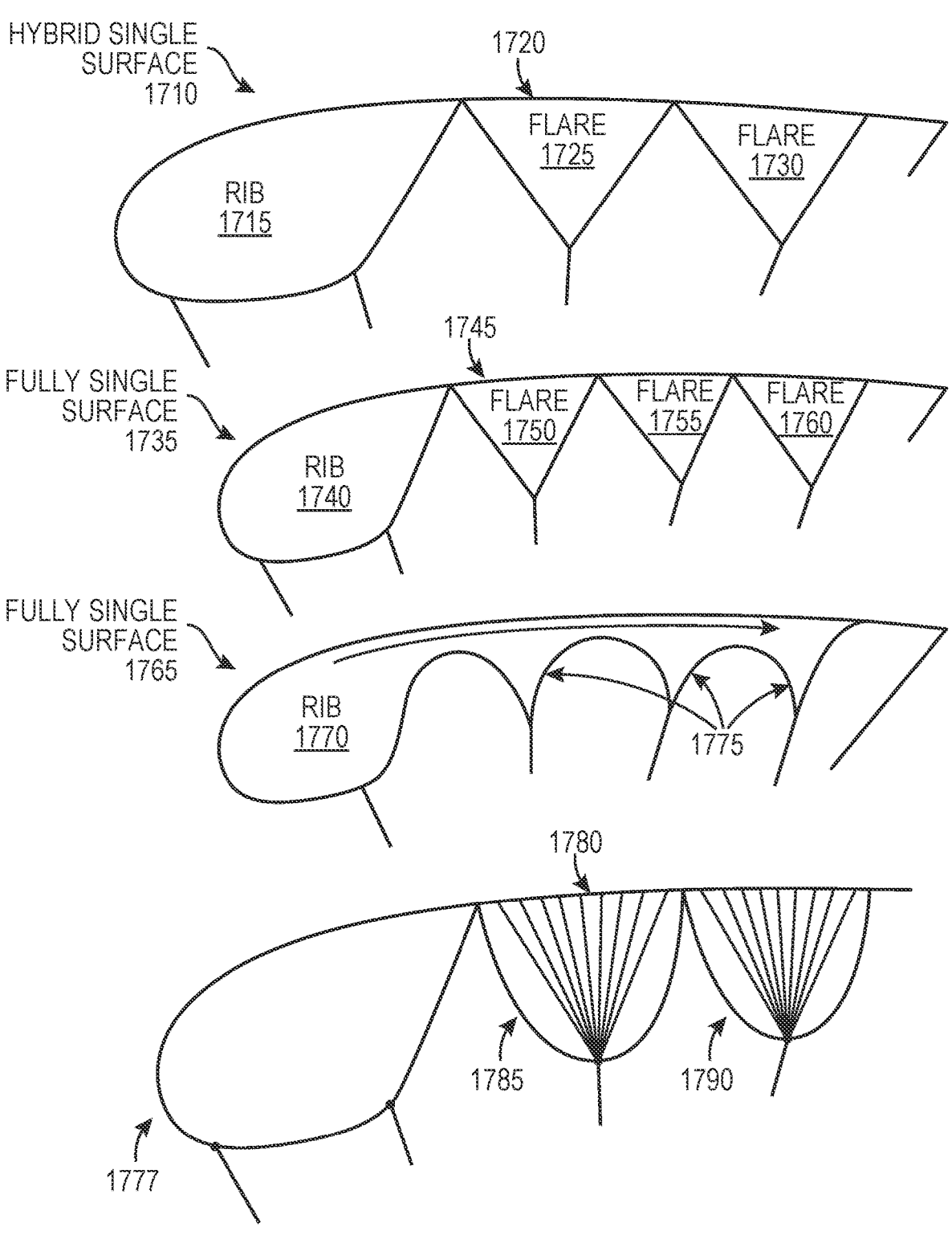

FIG. 11 is an alternative example embodiment of a full composite build parachute that is a partial single-surface parachute, with nose air inlets and fully ram-air wingtip cells, in accordance with an embodiment of the current disclosure;

FIG. 12 illustrates a 3-way folded sewn seam showing a top surface and its rib or flare, in accordance with an embodiment of the current disclosure;

FIG. 13a illustrates an example embodiment of a line attachment method, including support tape, a zig-zag stitch, and webbing in accordance with an embodiment of the current disclosure;

FIG. 13b illustrates an example embodiment of a traditional line attachment that would be found on commercial ram-air canopies, in accordance with an embodiment of the current disclosure;

FIG. 13c illustrates a sample method for creating a line attachment method, in accordance with one or more techniques of the current disclosure;

FIG. 14 illustrates an example method of a parachute deployment in accordance with one or more techniques of the current disclosure;

FIGS. 15a-15d illustrate example embodiments of packing and deployment of a parachute in accordance with one or more embodiments of the current disclosure;

FIG. 16 illustrates an example embodiment of composite build bonded seams, in accordance with one or more embodiments of the current disclosure; and FIG. 17 illustrates an example embodiment geometries of flares, in accordance with one or more embodiments of the current disclosure.

DETAILED DESCRIPTION

Generally, a ram-air canopy is a standard type of parachute. Usually, ram-air parachutes are shaped like a wing with a top surface and a bottom surface with ribs in between. Typically, a rib is a vertical piece of fabric that connects a top surface to a bottom surface of a parafoil or canopy. Conventionally, a rib can either be a "loaded rib" or an "unloaded rib." Generally, a "loaded rib" has support tape and a line attachment at its bottom. Generally, a payload or pilot is suspended from a parachute by suspension lines. Typically, suspension lines are usually braided lines that are individually attached to the bottom of a parachute and converge at payload or pilot. Usually, suspension lines are an important part of parachute design, since in addition to suspending pilot or payload, the lengths and configurations of these suspension lines form a structural element of the parachute design. Usually, support tape is a variety of lightweight webbings sewn into a fabric to carry a load and prevent fabric from ripping or stretching.

Typically, line attachments are a locus where suspension lines attach to a canopy in order to suspend a person or payload below a canopy for descent or transportation purposes. Generally, different types of line attachments exist. Conventionally, one type of line attachment occurs at a flare's end. Usually, a flare was originally created to attach suspension lines to a bottom surface of a canopy. Typically, in early designs, an external flare was attached to a ram-air canopy's bottom surface in order to attach suspension lines to a canopy bottom. Conventionally, a flare distributes tension from a suspension line across a wider surface of a canopy. Generally, now some ram-air canopies use limited internal flares to support suspension lines, in addition to loaded ribs. Typically, a flare is created for line attachment but not all line attachments require a flare. Usually, many commercial full ram-air canopies no longer use flares because they use internal ribs to distribute load from line attachment. Conventionally, on a loaded rib, support tape strengthens a fabric in order to support line attachments to affix suspension lines in order to carry a payload. Usually, typical parachutes only use one flare per rib or every other rib.

Generally, an "unloaded rib" lacks support tape and has no line attachment. Usually, an unloaded rib provides additional structure to a canopy. Typically, in many commercial ram-air canopies, every other rib is a loaded rib and other ribs are unloaded ribs. Conventionally, an area on a canopy spanning between two adjacent loaded ribs is called a cell. In some embodiments, a cell may be a space between two adjacent loaded ribs. In certain embodiments, a cell may be described as a lateral portion of a canopy in between adjacent line attachment points. Generally, on most commercial ram-air canopies, a cell will have an unloaded rib in its middle, parallel to its two adjacent loaded ribs.

Usually, ribs contain holes called "crossports" that allow for pressure equalization between cells. Typically, as a ram-air parachute moves forward it inflates through a nose, which is an entry area for air, inflating a wing into an airfoil shape and generating lift. Conventionally, lift is a positive contributor to glide ratios. Generally, a ram-air design is a canopy design that has dominated parachutes for approximately 40-50 years because of its glide ratio. Typically, a glide ratio may be a ratio of lift forces to drag forces, which corresponds to the ratio of horizontal distance traveled to vertical distance traveled while in gliding flight.

Conventionally, an older design is that of round parachutes, where any forward movement is generated with vents in a rear of a canopy and glide is very limited. Typically, a vent may be rear-facing holes in fabric of a round canopy, which provide forward motion by venting pressurized air to the rear. Generally, a round parachute canopy is capable of producing significantly less glide than a ram-air canopy provides. Usually, a ram-air parachute may have a 3:1 glide ratio so a parachutist or payload can move forward and land at a specific spot instead of being subject to wind. Typically, a round parachute may have a 1:1 glide ratio or less. Generally, round parachutes only have suspension lines on a skirt and in the center of a canopy, where primary structure of a canopy is formed via air pressure below a single surface of a round canopy.

Usually, a ram-air parachute has a top surface, bottom surface, and ribs in between. Generally, when a ram-air parachute moves forward, it has air forced into a nose while in flight and that air is what keeps it pressurized. In certain embodiments, Applicant has realized that most lift may be generated by a top surface of a parachute. Typically, a bottom surface of a parachute is there primarily for structure.

In some embodiments, Applicant has realized that a ram-air parachute may be compared to an airplane wing; a ram-air parachute has an airfoil shape like a wing that generates lift with a curved top and a flat bottom. In some embodiments, ribs may give a parachute structure. In certain embodiments, a ram-air parachute may keep its shape by air getting forced into a nose of a canopy as it moves forward, which pressurizes a parachute like a balloon. In many embodiments, a ram-air parachute may mean that air is getting forced into a nose of a canopy and pressurizing an interior of it. In some embodiments, an air deployable parachute may mean that a parachute can be deployed in freefall. In certain embodiments, deployed in freefall may mean a parachute can be deployed after exit from an aircraft.

Generally, manufacturers producing current ram-air canopies utilize common seam sewing techniques to connect canopy segments. Conventionally, sewn seams can be sewn in either shear or peel direction. Usually, shear seams distribute load across a wider surface area than peel seams. Generally, shear seams are necessary for a bottom surface to avoid point loading all stress on a small area during deployment. Conventionally, point loading stress into a small area will cause failure, possibly by ripping or stretching. Typically, on a sewn canopy, loading everything in a shear direction adds complexity and weight. Usually, on a sewn canopy, a top surface seam can be partially loaded in peel direction to avoid complexity and weight. Generally, a top surface seam can withstand peel direction loading because woven fabrics have a tendency to naturally distribute load.

Typically, suspension lines hang down from a canopy. Usually, a fabric rectangle with four grommets attached is called a slider. Generally, suspension lines are run through grommets, allowing a slider to slide up or down suspension lines. Conventionally, when a parachute is packed, a slider is pushed all the way up suspension lines so it restricts a canopy and holds it together. Typically, when a parachute first deploys, a slider is up at the top of suspension lines, restricting a canopy from opening. Conventionally, a slider constricts a canopy so that a canopy does not generate as much drag at first. Usually, if a canopy is deployed at human terminal velocity without a slider and opens instantly, rapid deceleration is likely to cause equipment damage, injury, or death. Generally, deployment of a ram-air canopy at terminal velocity without a slider would result in rapid deceleration and would injure or kill a parachutist. Typically, a slider's purpose is to reduce severity of deceleration by constricting a canopy and allowing it to gradually spread open. In most embodiments, Applicant has realized a slider having only four grommets is sufficient for most fully-ram-air canopies but may not be sufficient for a canopy with an expanded aspect ratio.

Usually, when a canopy is first deployed a slider keeps it from spreading the whole way and slows down opening. Generally, a slider slows a canopy opening for a softer deceleration and the slider stays at a top of the suspension lines until jumper and canopy slow down enough that pressure in nose and canopy exceeds drag on bottom of slider and then slider slides down suspension lines and allows canopy to fully spread. Conventionally, a slider slows down a canopy opening to approximately a 5-7 second process instead of an instantaneous opening. Generally, a canopy may be able to open in a time from 1 to 10 seconds. Conventionally, slowing a canopy opening makes deployment of a parachute into a 120 mile per hour relative wind survivable.

In most embodiments, Applicant has realized that for military applications, such as a need to carry a service parachutist and a heavy rucksack, there may need to be a very large parachute. In certain embodiments, Applicant has realized that two parachutes may be needed: a main parachute and a reserve parachute. In many embodiments, Applicant has realized that parachutes may result in a 60 pound parachute rig that needs to be carried by a service parachutist to get to the ground.

In many embodiments, the current disclosure may enable a parachute with reduced weight and bulk. In some embodiments, a reduction of weight and bulk may be achieved by removing a bottom surface of a canopy and continuing to find a way to keep an airfoil shape. In certain embodiments, as Applicant has realized, most lift may be generated by a top surface of a parachute and a bottom surface of a parachute may provide structure. In many embodiments, a parachute may have a partial single-surface ram-air canopy and a partial portion that is a dual-surface ram-air canopy. In certain embodiments, a parachute may have a new slider to work with a canopy's adjusted aspect ratio. In some embodiments, seams of a parachute may be strengthened to reduce volume of materials used.

In many embodiments, aspect ratio may be a major contributor to glide ratio. In some embodiments, single-surface and hybrid single-surface canopies may be at a severe disadvantage in glide ratio due to a broken airfoil. In some embodiments, an extreme aspect ratio or aspect ratio outside of what is used in a ram-air parachute may regain glide that was lost by going to a single-surface or hybrid single-surface.

In some embodiments, openings may be a challenge as it may be difficult to get clean openings from a very wide aspect ratio canopy. In certain embodiments, a revised slider may improve ability of a parachute with a wide aspect ratio to have a successful opening.

In certain embodiments of the current disclosure, a nose and wingtips of a canopy may have a ram-air structure. In some embodiments, a parachute may have crossport holes in between cells that inflate wingtips once air enters through a nose. In some embodiments, a crossport may be holes that are in ribs, allowing air pressure to equalize between cells in a ram-air portion of a wing or parachute. In some embodiments, the current disclosure may enable a hybrid single-surface canopy that differs from a typical ram-air parachute in that there may not be any unloaded ribs on the canopy. In certain embodiments, the current disclosure may enable a canopy where every rib may be loaded and every rib may have line attachments, so a "cell" may be the space between any two ribs. In certain embodiments, as two cells closest to the wingtips do not have an inlet (opening in a nose), they may be pressurized entirely through crossports. In many embodiments, wingtips may be spanwise edges of a canopy, where end cells stop. In certain embodiments, wingtips may be a significant contributor to drag in any airfoil, and their design may have a significant impact on the overall performance of a wing.

In some embodiments, wingtips may be spanwise edges of a canopy. In many embodiments, wingtips may be important to how a canopy performs, since wingtips may be a source of a large portion of total drag produced by a canopy in flight.

In some embodiments, the current disclosure may enable a hybrid single-surface canopy with inflated end-cells. In some embodiments, inflated end-cells may provide structure to a canopy, keep wingtips pushed out, and mitigate rippling of canopy fabric that may occur. In many embodiments, inflated wingtips may further reduce drag by eliminating an air inlet at a nose of an end-cell. In some embodiments, inflated end-cells may be fully inflated through crossports, getting their air pressure from adjacent cells.

In many embodiments, a parachute may have a nominally rear ⅔ of the canopy that is a top surface with triangular pieces of fabric called flares on it. In other embodiments, a flare may be a shape other than a triangle. In certain embodiments, a flare may be an arch. In other embodiments, a flare may be a semicircle. In most embodiments, a geometric design of a flare may be made to minimize the amount of material used to make a flare. In many embodiments, a triangle or arch may use less material and be more beneficial for making a flare than another geometry such as a semicircle. In almost all embodiments, Applicant notes it took much experimentation to arrive at a parachute that was stable and able to fly with ⅔ of the canopy being a top surface without a bottom surface. In some embodiments, multiple flares may attach to a single suspension line. In other embodiments a single suspension line may attach to multiple flares. In certain embodiments, a single suspension line may attach to two flares. In certain embodiments, a single suspension line may attach to three flares. In certain embodiments, a single suspension line may attach to four flares. In some embodiments, a suspension line may be attached to one or more flares through use of a line attachment point. In some embodiments, a line attachment point may be a loop of webbing where a suspension line attaches. In many embodiments, Applicant has realized that it may be beneficial to attach multiple flares to a suspension line for a fully single-surface or hybrid single-surface parachute.

In some embodiments, the current disclosure may enable multiple flares to be connected to one line attachment. In many embodiments, using multiple flares on one line attachment may allow for a wider distribution of a load, and a lower number of suspension lines. In certain embodiments, using multiple flares may make multiple cells use the same line, instead of each cell being supported by an individual line. In certain embodiments, using multiple flares on one line attachment may reducing line count while adding extra cells/support.

In most embodiments, Applicant has realized that a majority of lift generated from a parachute may come from a curved top surface and may occur in approximately a front 10-30% of a wing of a parachute. In some embodiments, a majority of lift may be generated from between 10 to 30% of a front of a wing of a parachute. In almost all embodiments, Applicant has realized that a rear ⅔ of a wing of a parachute may generate less lift than a front ⅓. In almost all embodiments, a parachute according to one or more aspects of the current disclosure may have a canopy with ⅓ of the parachute including top and bottom structure and a rear ⅔ being a single surface. In some embodiments, a parachute according to one or more aspects of the current disclosure may have a parachute with about ⅓ of the parachute including top and bottom structure and about a rear ⅔ being a single surface. In certain embodiments, a parachute with a ram-air design in about a first ⅓ of the parachute and a single surface in about a rear ⅔ may enable sufficient lift in a front of the parachute and enable control surfaces in the rear of the parachute. In almost all embodiments, a parachute that is partially a single surface, such as an about ⅓ full parachute and ⅔ single surface may greatly reduce parachute weight. In many embodiments, Applicant has realized that most lift may be at a top of a nose. In some embodiments, a partial ⅓ ram-air nose parachute paired with a single surface may stretch around wingtips. In further embodiments, a forward minority of a canopy may be a ram-air canopy and a majority of a canopy may be a single surface. In some embodiments, a top portion may be less than ⅓.

In many embodiments, Applicant has realized a typical slider style from a fully ram-air canopy may not work with a redesigned parachute, such as a single-surface or hybrid single-surface parachute. In most embodiments, a typical rectangular slider may not work with a redesigned parachute with a wide aspect ratio. In most embodiments, Applicant realized a typical rectangular slider may operate too quickly or too slowly for a redesigned parachute. In almost all embodiments, Applicant has realized that a new slider may need to be used with a redesigned parachute.

In some embodiments, a modified slider may accommodate for some design parameters that were pushed to the extreme in an effort to increase the glide ratio. In other embodiments, single-surface and hybrid single-surface canopies may be at a dramatic disadvantage in the area of glide ratio. In certain embodiments, a hybrid single-surface architecture may sacrifice approximately 40% of the efficiency of a canopy when compared to a fully ram-air canopy of a similar design. In many embodiments, to compensate for efficiency loss, an aspect ratio and an anhedral arc of a canopy may be pushed beyond what is usually acceptable for a deployable canopy, and closer to ranges seen in a paraglider. In many embodiments, negative pressure on the wingtips during deployment may occur when using a standard rectangular slider, and this inhibited opening. In most embodiments, a wider slider may allow wingtips to spread further, and mesh on the sides of the wider slider allows maintaining of positive pressure on the wingtips. In most embodiments, increased number of grommets on a slider may prevent increased number of suspension lines from interfering with each other.

In some embodiments, a new slider may be used to accommodate design parameters that were pushed to the extreme in an effort to increase glide ratio. In other embodiments, Applicant has realized that single-surface and hybrid single-surface canopies may be at a dramatic disadvantage in the area of glide ratio. In some embodiments, a hybrid single-surface architecture may sacrifice approximately 40% of the efficiency of a canopy when compared to a fully ram-air canopy of a similar design. In some embodiments, to compensate for loss of efficiency in a hybrid single-surface, the current disclosure may enable an aspect ratio to be and the anhedral arc of the canopy to be pushed beyond what is usually acceptable for a deployable canopy, and closer to ranges seen in a paraglider. In many embodiments, changing of geometry of a canopy may result in negative pressure on wingtips during deployment when using a standard rectangular slider, which may inhibit opening of a parachute or canopy. In certain embodiments, a wider slider may allow wingtips to spread further. In many embodiments, increased number of grommets may prevent increased number of suspension lines from interfering with each other. In most embodiments, a wider aspect ratio may require additional cells. In many embodiments, adding additional cells may require adding additional suspension lines to the parachute. In certain embodiments, adding additional cells may create increased complexity with a slider and parachute opening.

In some embodiments, the current disclosure may enable a slider with an extension on each side of the slider with a grommet at the end of the extension. In certain embodiments, a slider may have mesh in an extension to allow air to pass through it. In certain embodiments, suspension lines may be placed on a wingtip on sides of a canopy and those suspension lines may run through an extension.

Typically, parachutes have sewn nylon versions of canopies that use traditional line attachment methods. Conventionally, traditional line attachment methods involve sewing a support tape to a rib's bottom or a flare's bottom to make a loop and then attaching associated suspension line to this loop. Generally, line attachment loops are sewn on with a tight series of stitches called a "bartack." In some embodiments, a traditional line attachment method involving loop and bartack may fail if installed on a fully composite build canopy. In many embodiments, tight sewing stitches may produce a weak point in normally strong composite fabrics.

In most embodiments, traditional line attachments or bartacks may not maintain strength or integrity on a fully composite built canopy.

In some embodiments, the current disclosure enables new line attachment methods for the composite fabric canopies. In certain embodiments, the current disclosure may enable a custom-build composite fabric with a triangular support patch on each side of a flare (or rib). In some embodiments, a composite fabric may have a support tape made from composite material running up the center. In many embodiments, the width of a support tape may be sized based on load. In certain embodiments, a wide zig-zag stitch may be used to attach a support webbing to a stack of composite material and outline the stack with wide zig-zag stitching. In certain embodiments, a support webbing may be a TY3 webbing. In some embodiments, a custom-build fabric support patch is able to hold continuous loads of over 200 lbs at its line attachment, with peak loads far beyond that.

Conventionally, traditional line attachment methods involve sewing a support tape to a rib's bottom or a flare's bottom to make a loop and then attaching an associated line to this loop. Generally, line attachment loops are sewn on with a tight series of stitches called a "bartack."

In some embodiments, a traditional line attachment method involving loop and bartack may fail if installed on a fully composite build canopy. In many embodiments, tight sewing stitches may produce a weak point in normally strong composite fabrics. In most embodiments, traditional line attachments or bartacks may not maintain strength or integrity on a fully composite built canopy.

In certain embodiments a fully composite canopy may require a new line attachment method. Traditional line attachment methods involve sewing a support tape to the bottom of a rib or bottom of a flare to make a loop and attaching the associated line to this loop. Generally, these line attachment loops are sewn on with a tight series of stitches called a "bartack".

This traditional line attachment method will easily fail if installed on a fully composite built canopy as composite fabrics are incredibly strong when tensioned, but tight sewing stitches produce a weak point on the material, and therefore traditional line attachments or bartacks cannot be used on a fully composite built canopy.

In certain embodiments, the following example method may be used for installing a line attachment on either a rib or a flare for a composite parachute:

Install a bonded support tape on the vertical length of the rib or flare, inline with the expected load on the line attachment, on one side only.

Install a shape-matching patch on both sides of the bottom of the rib or flare. This should also be bonded and not sewn.

Sew a strip of webbing or support tape to the bottom of the rib or flare, so that the bottom of the webbing or support tape creates a loop for the line to attach to. Note: this sewing should be performed with a very wide zigzag stitch, with a large stitch spacing, to avoid clustering stitches in any concentrated area of the material.

Sew the perimeter of the bonded patches. This sewing should be performed with a very wide zigzag stitch, with a large stitch spacing, to avoid clustering stitches in any concentrated area of the material.

The stitching on the perimeter of the patches is to prevent any slippage of the bonded patches. The stitching on the support tape that makes the line attachment loop transfers the load to the patches and the vertical support tape above it.

In some embodiments, a slider may be large enough to slow down a parachute opening but may allow air to pass through and assist spreading wingtips of the parachute opening. In most embodiments, a slider according to one or more techniques of the current disclosure may slow a parachute down enough for a decent opening where extensions on wingtips of the parachute may allow enough air pressure in after the opening has been slowed to continue spreading a canopy open for a full deployment of the parachute.

In some embodiments, the current disclosure may enable taking wingtip suspension lines and running them through an extended grommet. Typically, wingtip suspension lines are usually not found on deployable canopies. In some embodiments, the current disclosure may enable a parachute such as a hybrid single-surface with wingtip suspension lines together and running through respective grommets on a slider, such that the wingtips may be farther apart during the deployment sequence and separate that portion of the canopy from the rest of it.

In certain embodiments, it may be beneficial to build a parachute out of composite material to decrease weight of the parachute. In a particular embodiment, a composite material may be Dyneema Composite Fabric. In many embodiments, a composite material may not be sewn and creating seams for a parachute made of a composite material may require the seams be created with adhesives. In certain embodiments, an adhesive may need to cure. In most embodiments, Applicant has realized that a seam using an adhesive may be stronger than a sewn parachute seam. In almost all embodiments, Applicant has realized that for adhesive seams on a parachute, each seam may need to be designed to limit loading to the shear direction of the seam and no seam may be able to be loaded in the peel direction. In many embodiments, Applicant has realized that seams may run in any direction on a parachute that is sewn. In many embodiments, with a parachute with adhesive seams, there may be support strips to add strength to those seams. In many embodiments, Applicant has realized that previous attempts at a partial single-surface ram-air canopy have been unsuccessful. In most embodiments, previous attempts at single-surface canopies were rectangular or square and had a low aspect ratio. In some embodiments previous attempts at a partial single-surface canopy may have had long suspension lines. In almost all embodiments, Applicant has realized that previous attempts at a partial single-surface canopy had unreliable openings and poor glide ratios. In certain embodiments, as Applicant notes above, an opening that is too quick may be deadly for a human parachutist. In many embodiments, Applicant has realized that a parachute that can be launched from a runway or is ground launchable may not be able to be air deployable as it may not be packed or have other rigid structures. In further embodiments, certain parachutes that may be ground launchable may not survive deployment from an airplane as the sudden force from deployment may destroy the parachute.

In some embodiments, the current disclosure may enable a hybrid single-surface ram-air canopy with a 4:1 glide ratio. In almost all embodiments, a 4:1 glide ratio may be high for a normal ram-air canopy, let alone one that is a partial single-surface.

In many embodiments, Applicant has realized that an aspect ratio may be one of the primary characteristics of a wing that creates a good glide ratio, a lift-to-drag ratio. In some embodiments, Applicant has realized that the wider the canopy is, vs. nose-to-tail, the more lift for drag that may be generated. In many embodiments, Applicant has realized that the wider aspect ratio you make a parachute, the less stable it may be. In most embodiments, the less stable a parachute is, it may be harder to get reliable openings out of it. In certain embodiments, with a wide canopy, Applicant has realized that there may be high malfunction rates because a wide aspect ratio may require more suspension lines and maintain less control over those suspension lines. In almost all embodiments, Applicant has realized that most often a parachute fabric does not malfunction, rather suspension lines of the parachute malfunction. In some embodiments, to enable a wide aspect ratio parachute, a wide aspect slider may need to be used.

Typically, the aspect ratio is the ratio of the span of the canopy (width) to the chord of the canopy (nose to tail). In many embodiments, Applicants have realized that an aspect ratio may be a primary determining factor in generating the glide ratio of a wing. In general, canopies with a low aspect ratio open more reliably and are more stable than canopies with a high aspect ratio. In most embodiments, the current disclosure enables safely widening of an aspect ratio to create an improved glide ratio.

Most air-deployable ram-air canopies have an aspect ratio between 2:1 and 3:1. Most ground-launch paragliders have an aspect ratio between 4:1 and 7:1. Ground launch paragliders do not need to deploy from freefall, so they are more tolerant of a high aspect ratio. In an embodiment of the current disclosure, an aspect ratio for a wing may be 3.6:1. In other embodiments of the current disclosure an aspect ratio for a wing may be lower than 3.6:1. In certain embodiments, a wider aspect ratio may compensate for efficiency losses in a hybrid single-surface platform. In some embodiments, a wider aspect ratio may require unique methods of packing and a unique slider to get clean deployments.

In many embodiments, Applicant has found that the more suspension lines that are added to a parachute the higher malfunction rate of that parachute may be. In many embodiments, the current disclosure may enable mitigating a higher malfunction rate of a parachute by using more grommets per slider instead of four grommets that are traditionally used with a parachute. In many embodiments, using more grommets may keep suspension lines separated from each other so that they do not interact on opening. In most embodiments, Applicant has realized that, as the aspect ratio of a parachute increases, the difficulty in achieving reliable openings may also increase. In certain embodiments, Applicant has realized that low aspect ratio canopies may offer more control over the suspension lines and a less chaotic opening, while high aspect ratio canopies generally open in a more chaotic manner.

In most embodiments, the current disclosure may enable a single-surface ram-air parachute that uses about 40% less material than a typical ram-air parachute and weighs about 40% less than a typical ram-air parachute. In further embodiments, the current disclosure may enable a parachute that is made out of a composite fabric. In some embodiments, a composite fabric may be a non-woven composite of two different materials, with one material providing the strength and the other material providing structure and porosity reduction. In other embodiments, a composite material may be woven. In further embodiments, a composite fabric may be non-woven. In most embodiments, a composite material may be a material comprised of two or more different materials, where each material adds a desired characteristic to the fabric. In a particular embodiment, a composite fabric may be Dyneema Composite Fabric. In many embodiments, a composite fabric may be about half a bulk and weight of a traditional parachute fabric with identical strength. In further embodiments, a hybrid single-surface ram-air parachute may be created with composite fabric to create a parachute that weighs much less than a typical ram-air parachute.

In a particular embodiment, a typical 400 square foot fully ram-air parachute may weigh seventeen (17) pounds and a hybrid single-surface parachute made of a composite fabric according to one or more of the techniques of the current disclosure may weigh about seven (7) pounds.

In some embodiments, to bond a composite fabric, a 3M 300LSE tape transfer adhesive may be used. In certain embodiments, tape transfer adhesive may be used on one piece of a fabric, pressure may be applied, the backing may be peeled off, and the joining piece of fabric may be placed on top and pressure applied.

In certain embodiments, for seams that involve two pieces of fabric, overlapping seams may be made. In many embodiments, overlapping fabrics may results in two layers of fabric in a seam. In other embodiments, for seams that involve two pieces of fabric, a felled seam on sewn woven fabric may contain four layers of fabric.

In almost all embodiments, in a pull test an adhesive seam may be stronger than a parachute material itself. In many embodiments, a point of failure in a pull test with an adhesive seam may be above or below the seam. In certain embodiments, a breaking strength of composite fabric may be 63 lb/in and a bond of the seam may immediately be stronger than the fabric. In many embodiments, a bond of a seam may continue to increase in strength as a function of time. In many embodiments, Applicant has realized that an adhesive seam may be particularly advantageous in a round parachute.

In certain embodiments, Applicant has realized that adhesive seams may be loaded in a shear direction, where an entire surface of the seam takes loading. In some embodiments, Applicant has realized that sewn seams may be loaded in a peel direction as long as it is not a high load area. In some embodiments, Applicant has realized that bottom surface seams may be primarily loaded in a shear direction and top surface seams may be loaded primarily in the peel direction. In some embodiments, Applicant has realized that adhesive seams may need to be loaded in a shear direction. In some embodiments, adhesive seams may be beneficial on a round canopy, as the round canopy may be constructed from simple overlapping seams.

In certain embodiments, an elliptical parachute with a wide aspect ratio canopy may need to be paired with a shape conforming slider with individual grommets for the suspension lines that may cause problems during opening. In certain embodiments, a slider with an elliptical design may more evenly cover a bottom surface of a canopy at line stretch and it may keep rear suspension lines and wingtip suspension lines in their own individual grommets. In some embodiments, rear suspension lines may be most likely to contribute to lineover malfunctions. In certain embodiments, wingtip suspension lines and rear suspension lines may be most likely to contribute to tension knot malfunctions. In some embodiments, keeping these suspension lines in their own individual grommets may help to space them farther from other suspension lines and control them during the opening sequence.

Figure 1:
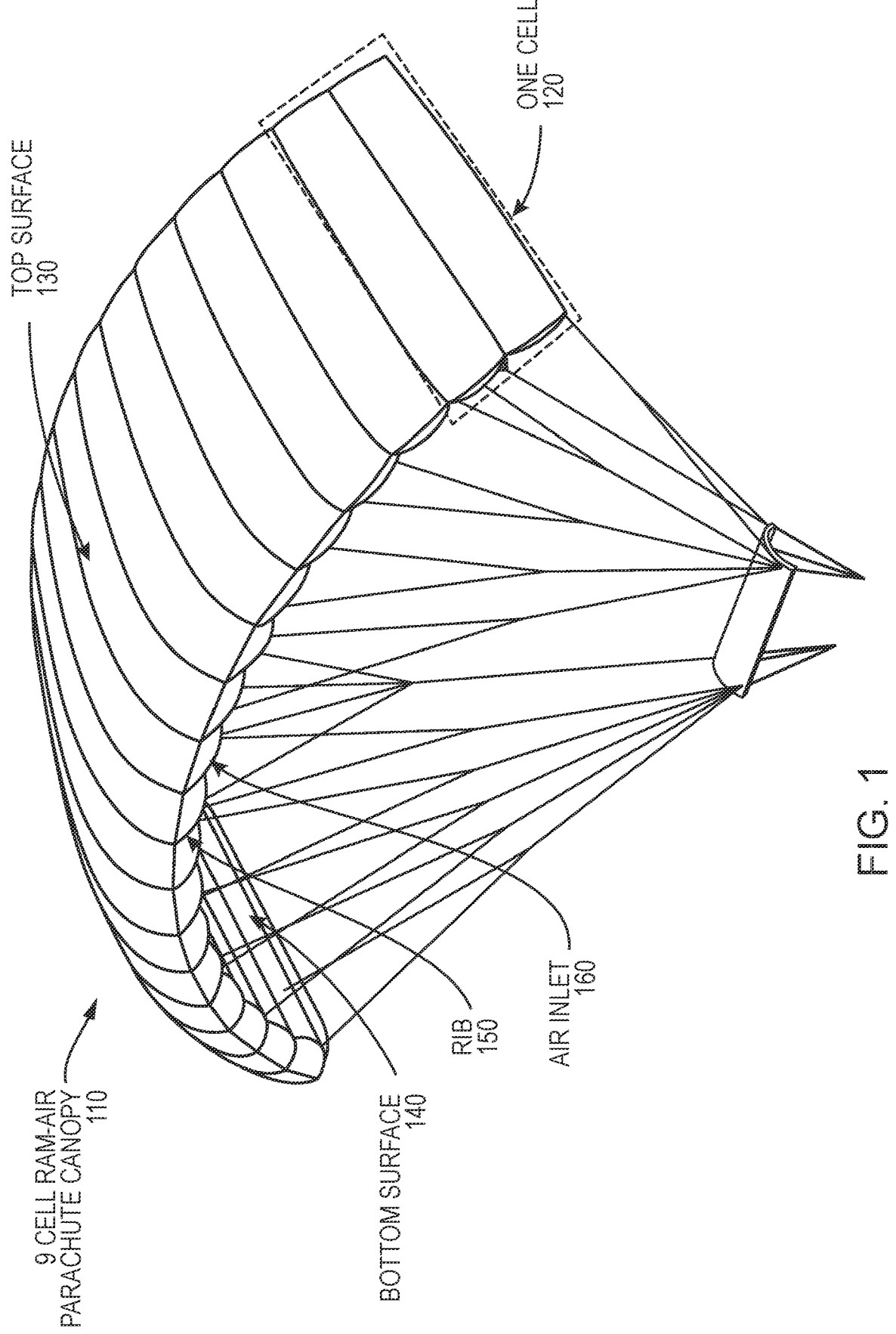
FIG. 1 illustrates a 9 cell ram-air parachute with a canopy made up of cells, configured with a top surface and a bottom surface, and comprised of ribs and air inlets, in accordance with an embodiment of the current disclosure.

Refer now to the example embodiment of FIG. 1, which illustrates a 9 cell ram-air parachute. 9 cell ram-air parachute canopy 110 consists of nine different fabric cells. For reference, one of the nine cells is indicated as 120. Canopy 110 has both a top surface 130 and a bottom surface 140. Between top and bottom surfaces are ribs. For reference, one of the ribs is indicated as 150. An area between ribs 150 and top surface 130 and bottom surface 140, with an opening on the front side of the canopy, is called an air inlet 160.

Figure 2:
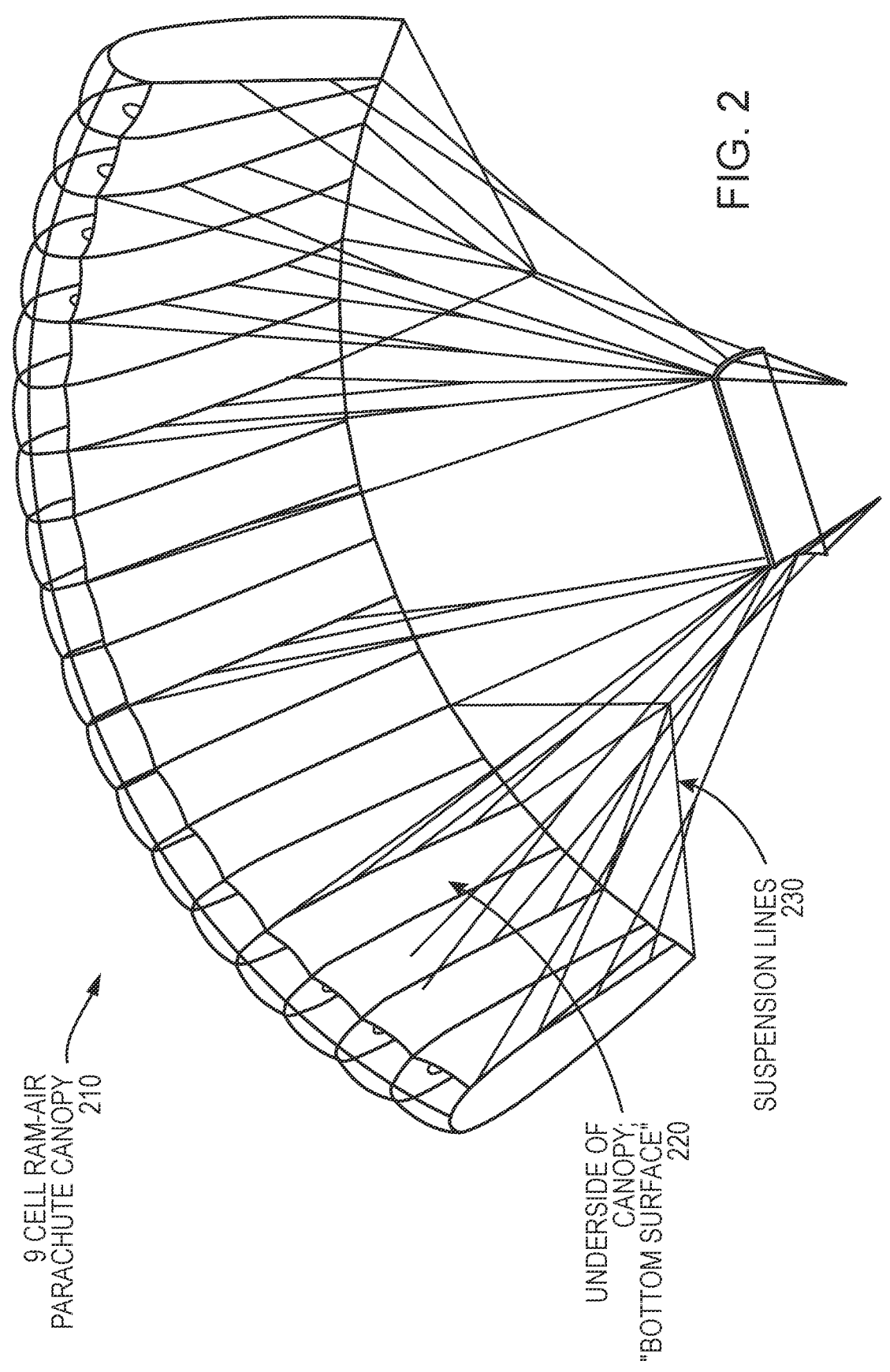
FIG. 2 illustrates a 9 cell ram-air parachute with a canopy angled to show its underside and connected suspension lines, in accordance with an embodiment of the current disclosure.

Refer now to the example embodiment of FIG. 2, which illustrates a 9 cell ram-air parachute showing a bottom surface. 9 cell ram-air parachute canopy 210 view reveals underside 220. Underside 220, also referenced as the bottom surface, is structurally important for stability. Hanging down from and connected to underside 220 are suspension lines 230. Suspension lines 230 are grouped. FIG. 2 illustrates a typical architecture found in commercially available canopies.

Figure 3:
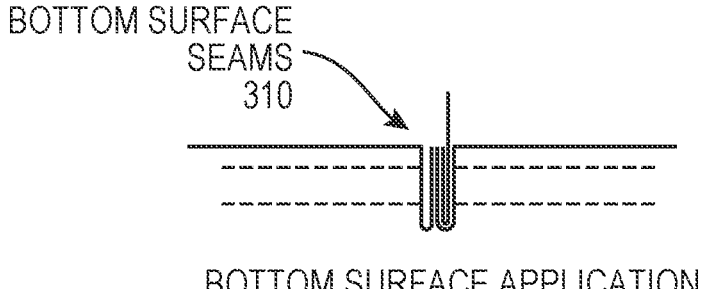
FIG. 3 is a drawing of three different types of seams typically found on a sewn ram-air canopy, depicting bottom surface seams, top surface seams, and unloaded rib seams, in accordance with one or more embodiments of the current disclosure.
Figure 3:
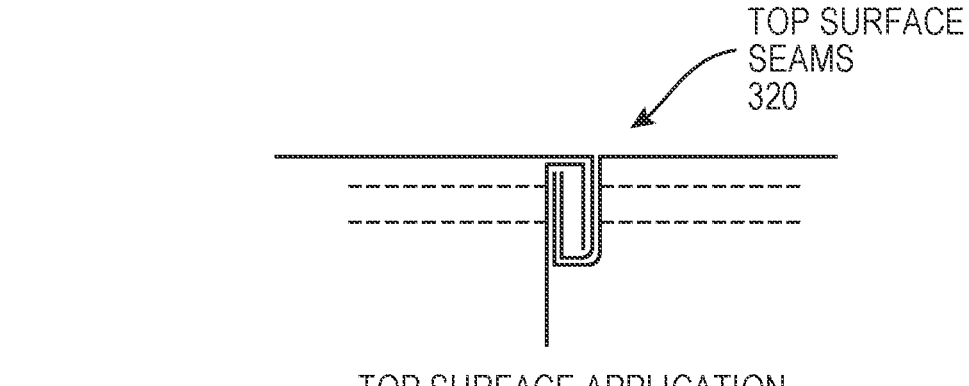
Figure 3:
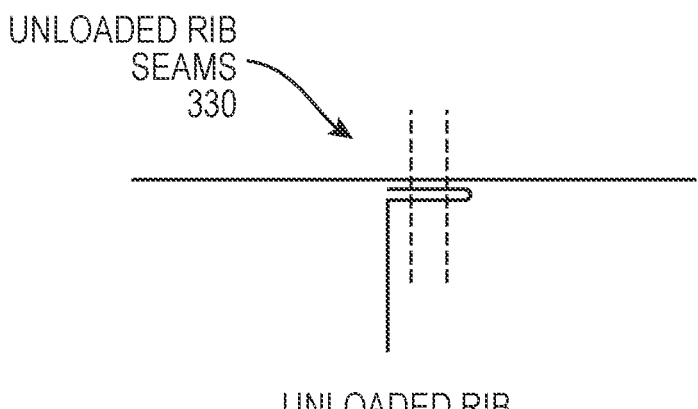

Refer now to the example embodiment of FIG. 3, a drawing of three different types of seams typically found on a sewn ram-air canopy: bottom surface application seam 310, top surface application seam 320, and unloaded rib seam 330. These seams are examples of seams that can be sewn on a fully ram-air canopy, a hybrid single-surface canopy, and even a single-surface canopy when sewn from woven textiles or ripstop nylon fabric.

Figure 4:
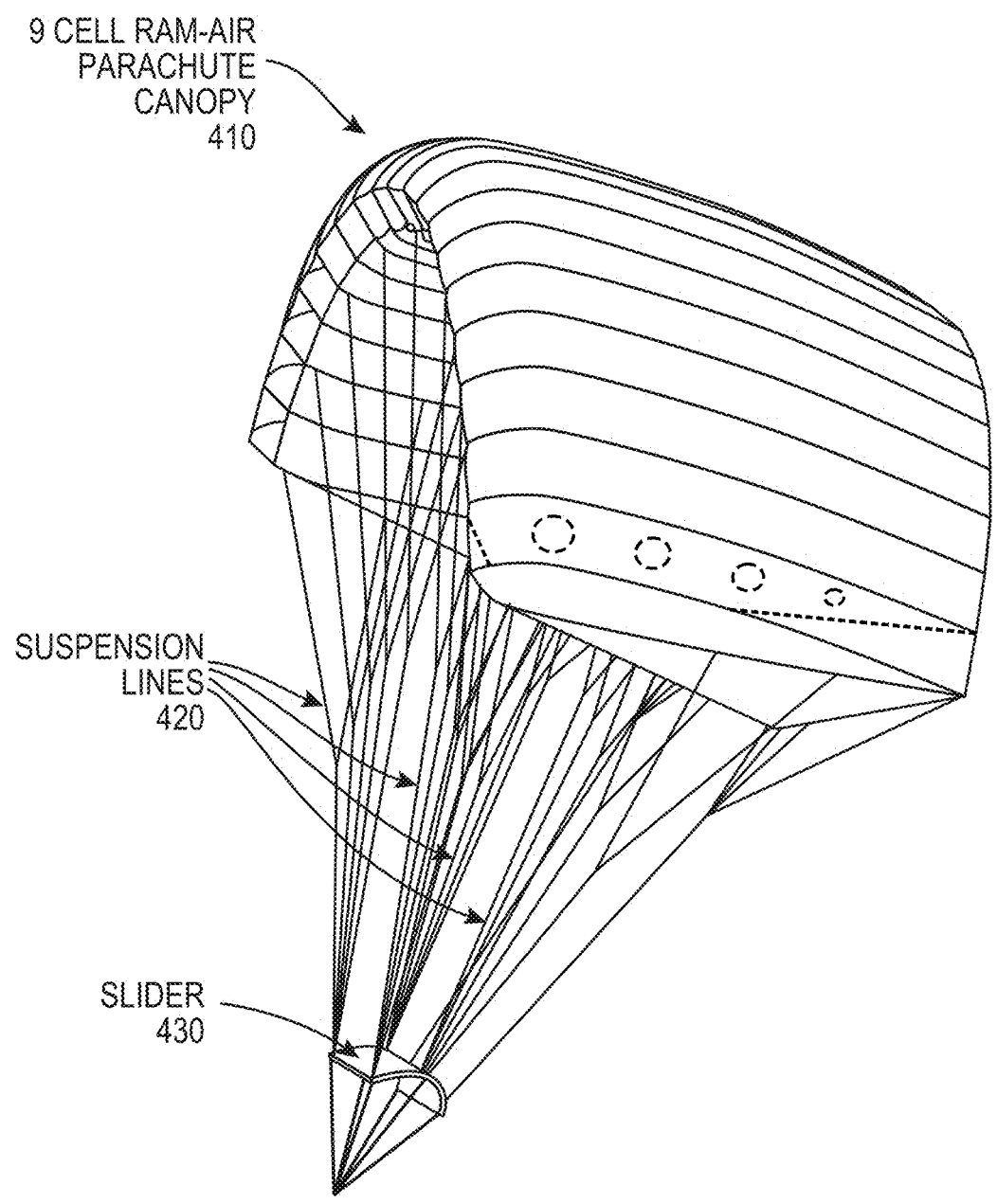
FIG. 4 illustrates a 9 cell ram-air parachute, depicting its canopy with suspension lines and slider beneath, in accordance with an embodiment of the current disclosure.

Refer now to the example embodiment of FIG. 4, which details a 9 cell ram-air parachute consisting of canopy 410 with suspension lines 420 and slider 430 beneath. FIG. 4 illustrates a typical architecture found in commercially available canopies.

Figure 5A:
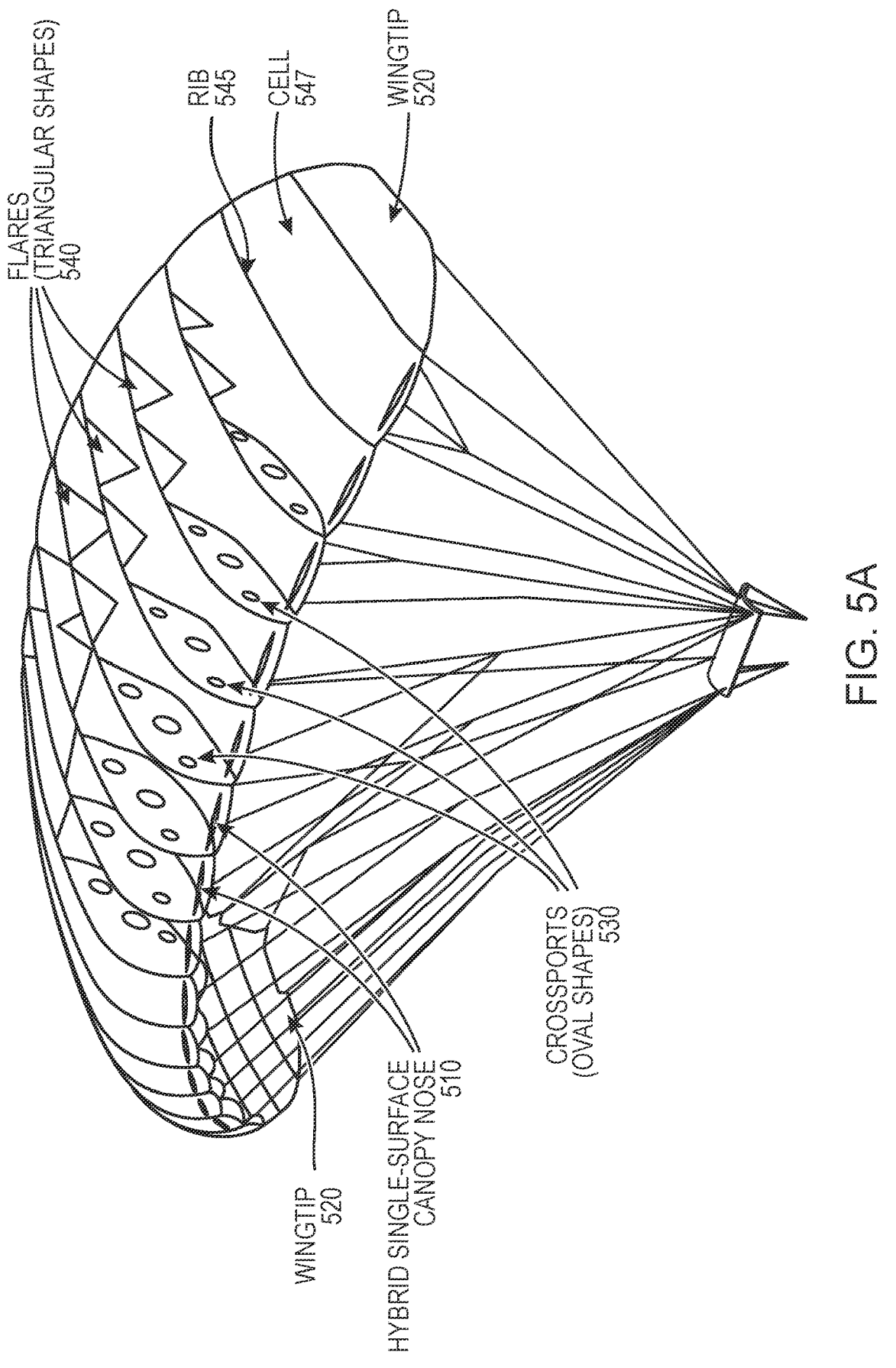
FIG. 5a illustrates a hybrid single-surface parachute, with its canopy nose, wingtips, internal crossports, flares, a rib, and a cell in accordance with an embodiment of the current disclosure.
Figure 5B:
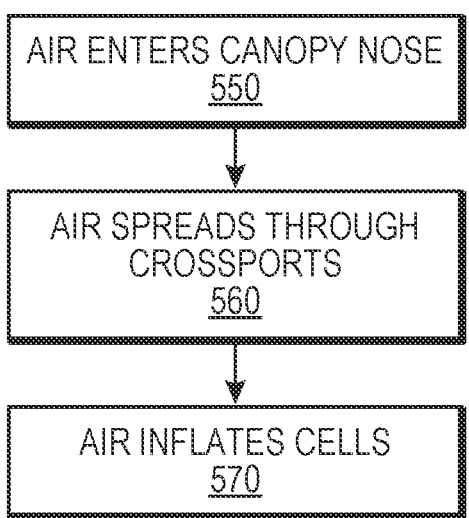
FIG. 5b is a flowchart of steps to inflate a canopy in accordance with an embodiment of the current disclosure.

Refer now to the example embodiments of FIGS. 5a and 5b, which illustrate a CAD drawing of a hybrid single-surface parachute (FIG. 5a) and a description of the steps of how parachute canopy components work together to inflate the canopy (FIG. 5b). The CAD drawing of FIG. 5a allows visualization of the interior of the canopy in a way that would not be possible otherwise. Canopy nose 510 and wingtips 520 are both constructed to be dual-surface ram-air. Crossports 530, or strategically placed in the ribs, such as rib 545 which may be circular or oval, permit airflow between ribs to maximize inflation. Air enters canopy nose 510 (step 550), filling compartments between the ribs, such as rib 545, and spreads through crossport 530 (step 560) channels to inflate cells (step 570), such as cell 547, to wingtips 520. FIG. 5a illustrates a novel hybrid single-surface architecture, with nose 510 and wingtips 520 of the canopy consisting of dual-surface ram-air sections, and the middle and rear portions of the canopy consisting of a single-surface architecture.

Figure 6:
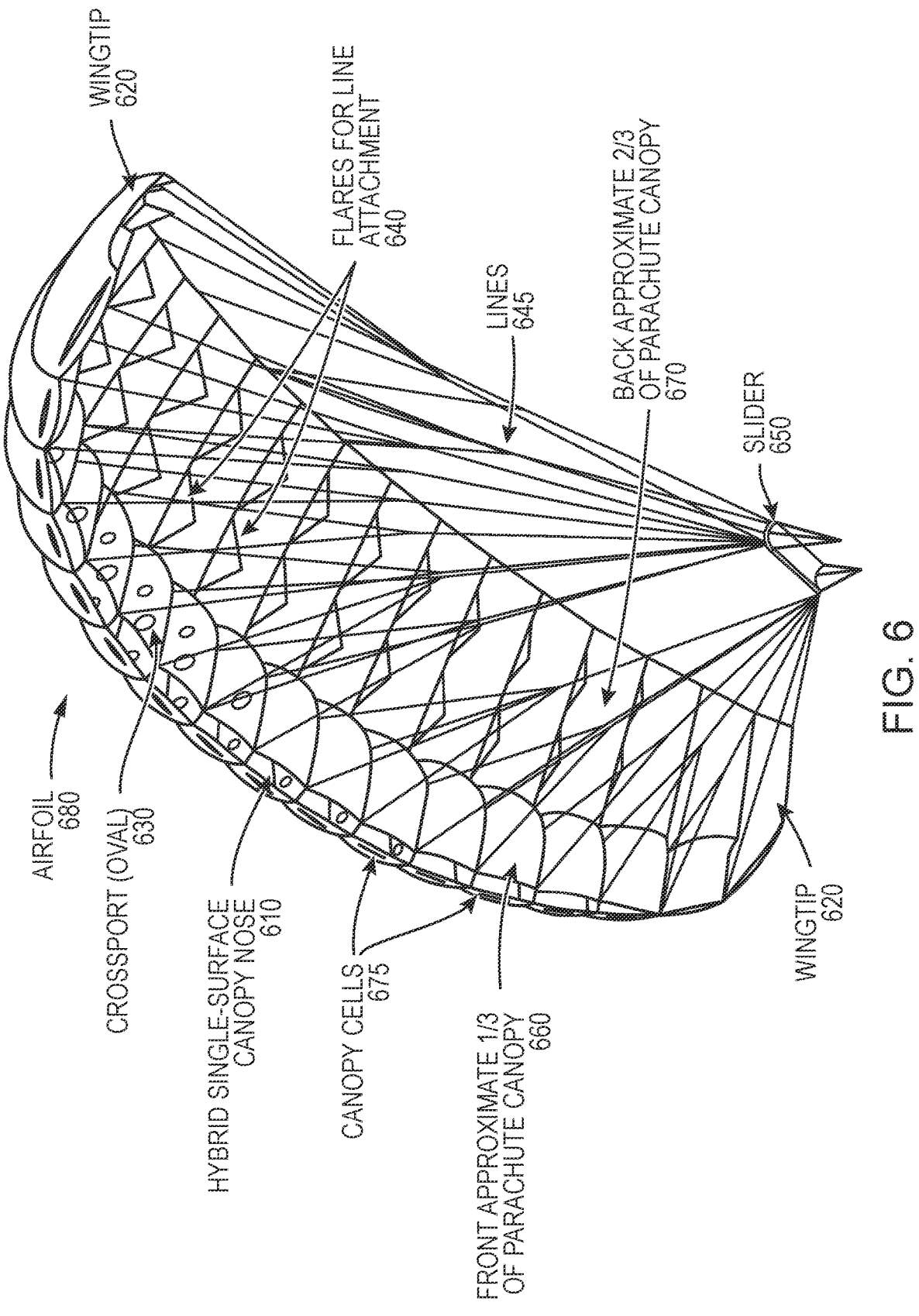
FIG. 6 is an example embodiment of a CAD drawing of a hybrid single-surface parachute, with its canopy nose, wingtips, crossport, flares, suspension lines, slider, cells, airfoil shape, and the front approximate ⅓ similar to a ram-air canopy and a single surface from the back approximate ⅔ of the parachute canopy, in accordance with an embodiment of the current disclosure.

Refer now to the example embodiment of FIG. 6, which illustrates an example embodiment of a CAD drawing of a hybrid single-surface parachute with a slider according to an embodiment of the current disclosure. Hybrid single-surface canopy nose 610 serves as the entry point for air to fill the canopy including canopy cells, such as canopy cells 675, reaching to wingtips 620. Complete inflation to the wingtips 620 creates an airfoil shape 680 which occurs as air passes through internal crossports 630. Triangular shaped flares 640 distribute the load from their line attachment points to create a comparatively flatter surface than if the suspension lines 645 were attached directly to the surface of the canopy. Slider 650 descends the suspension lines 645 as the canopy opens in order to help to slow the opening of the parachute, to reduce loads placed on the canopy and on the cargo/pilot. In some embodiments, a hybrid single-surface canopy may be divided into its composite parts—dual surface and single surface. In the embodiment of FIG. 6, approximately the front ⅓ of the canopy 660 is dual surface whereas approximately the back ⅔ of the canopy 670 is single surface.

Figure 7:
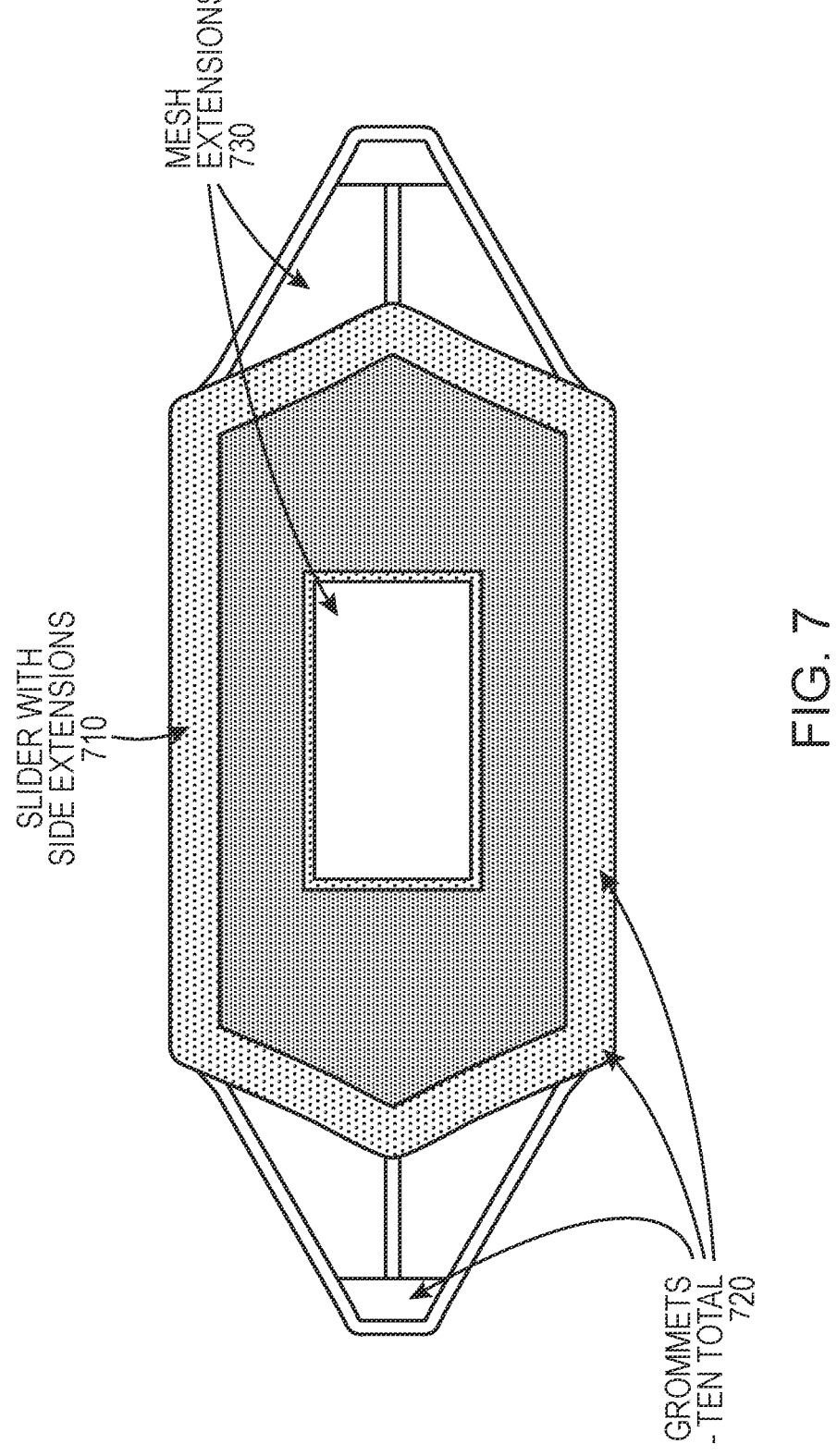
FIG. 7 is an example embodiment of a slider with side extensions, grommets, and mesh insert, in accordance with an embodiment of the current disclosure.

Refer now to the example embodiment of FIG. 7, which illustrates a slider according to one or more techniques of the current disclosure. Specially designed, slider 710 with side extensions 730 is wider than a typical slider. With additional material to hold them, grommets 720 are placed along the perimeter for the suspension lines to feed through. Mesh enables more airflow than nylon and by utilizing mesh extensions 730 on both sides of slider 710 as well as in a middle panel, greater airflow is achieved than a solid nylon slider of the same dimensions would permit. The widened slider, mesh inserts, and additional grommets enable a parachute to open to match the varying opening speeds of the different areas of the canopy.

Figure 8:
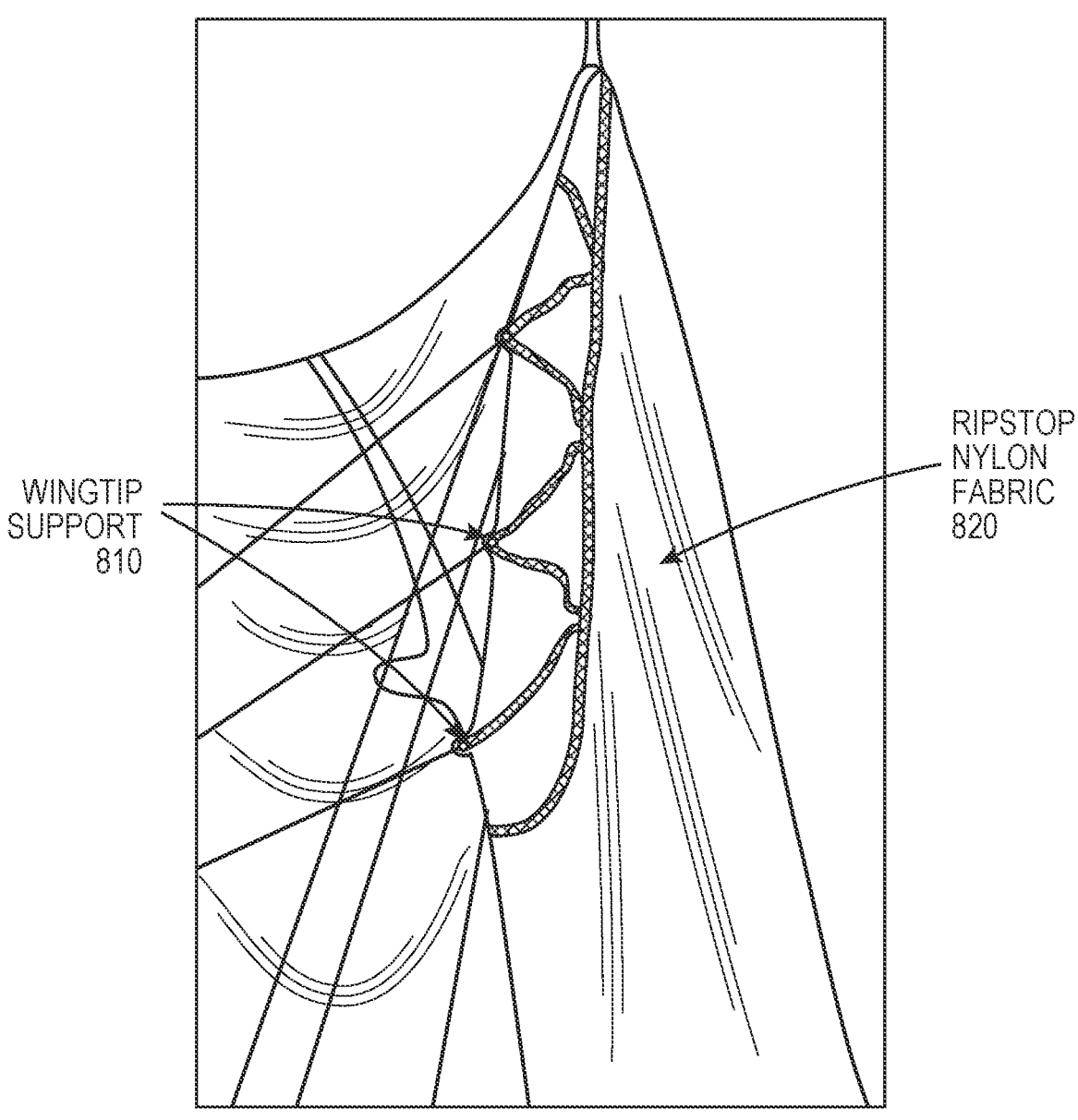
FIG. 8 is an example embodiment of a wingtip, in accordance with an embodiment of the current disclosure.

Refer now to the example embodiment of FIG. 8, which illustrates an example embodiment of a wingtip according to one or more techniques of the current disclosure. Wingtip support 810 provides additional strength to the ripstop nylon fabric 820 that comprises the canopy material.

Figure 9:
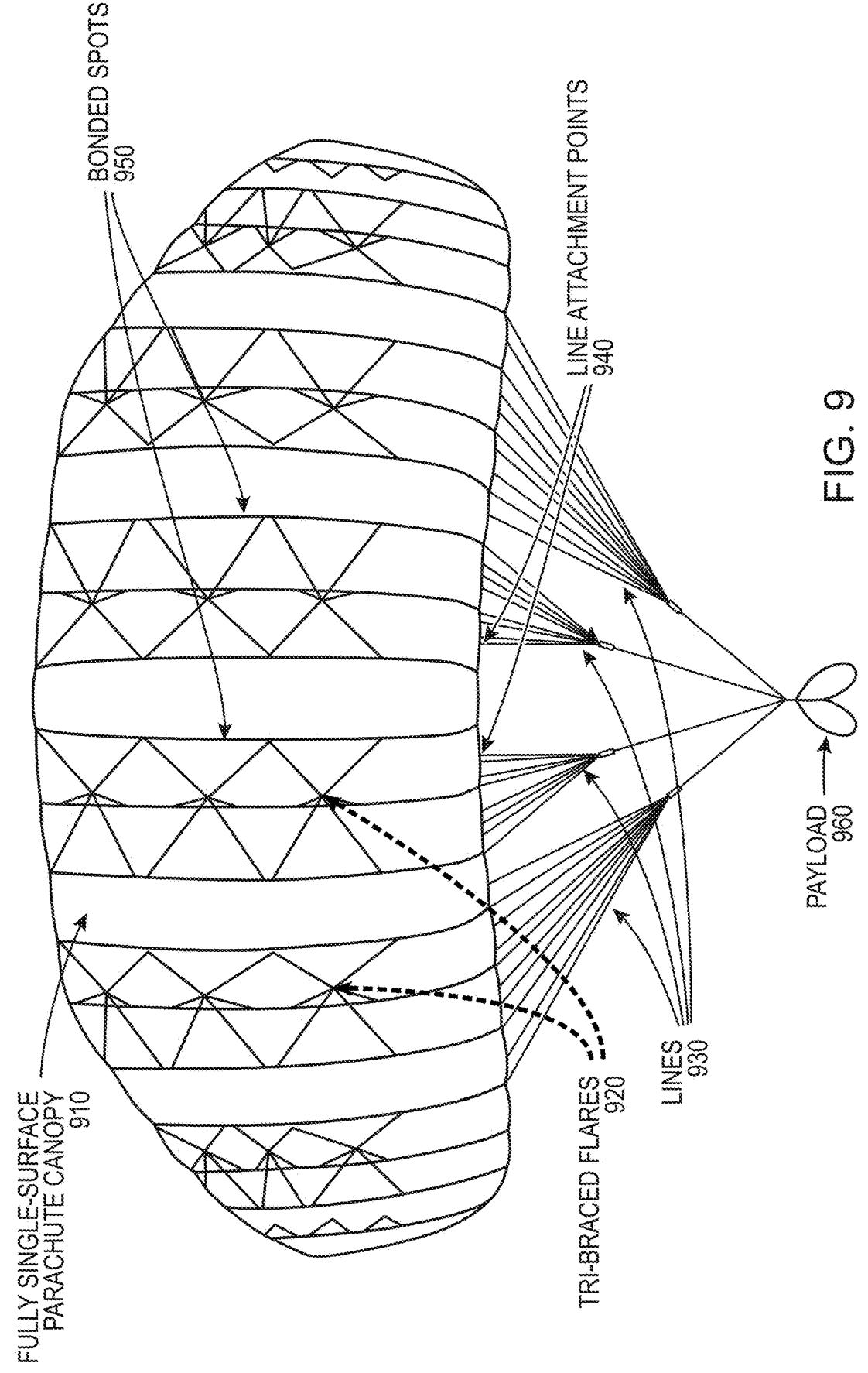
FIG. 9 is an example embodiment of a fully single-surface parachute, with fully single-surface canopy, tri-braced flares, suspension lines, line attachment points, bonded seams, and payload in accordance with an embodiment of the current disclosure.

Refer now to the example embodiment of FIG. 9, which illustrates an example embodiment of a fully single-surface parachute according to an embodiment of the current disclosure. The canopy 910 of the fully single-surface parachute includes supportive tri-braced flares 920. The suspension lines 930 connect to the flares 920 at the line attachment points 940 to distribute the weight of a payload 960 across the three flares 920 equally. In some embodiments, the current disclosure may enable a novel canopy 910 that may be a fully single-surface architecture, with all portions of the canopy 910, including the nose, being only a single surface of material. In certain embodiments, each suspension line 930 may be attached to three flares 920 that distribute load to a top surface of a canopy 910. In certain embodiments, a canopy 910 build may be constructed from bonded composite materials which are joined together via a bonding technique in certain bonded spots 950. In some embodiments, a canopy may depend on external pressure below the canopy to maintain structure of the canopy.

Figure 10:
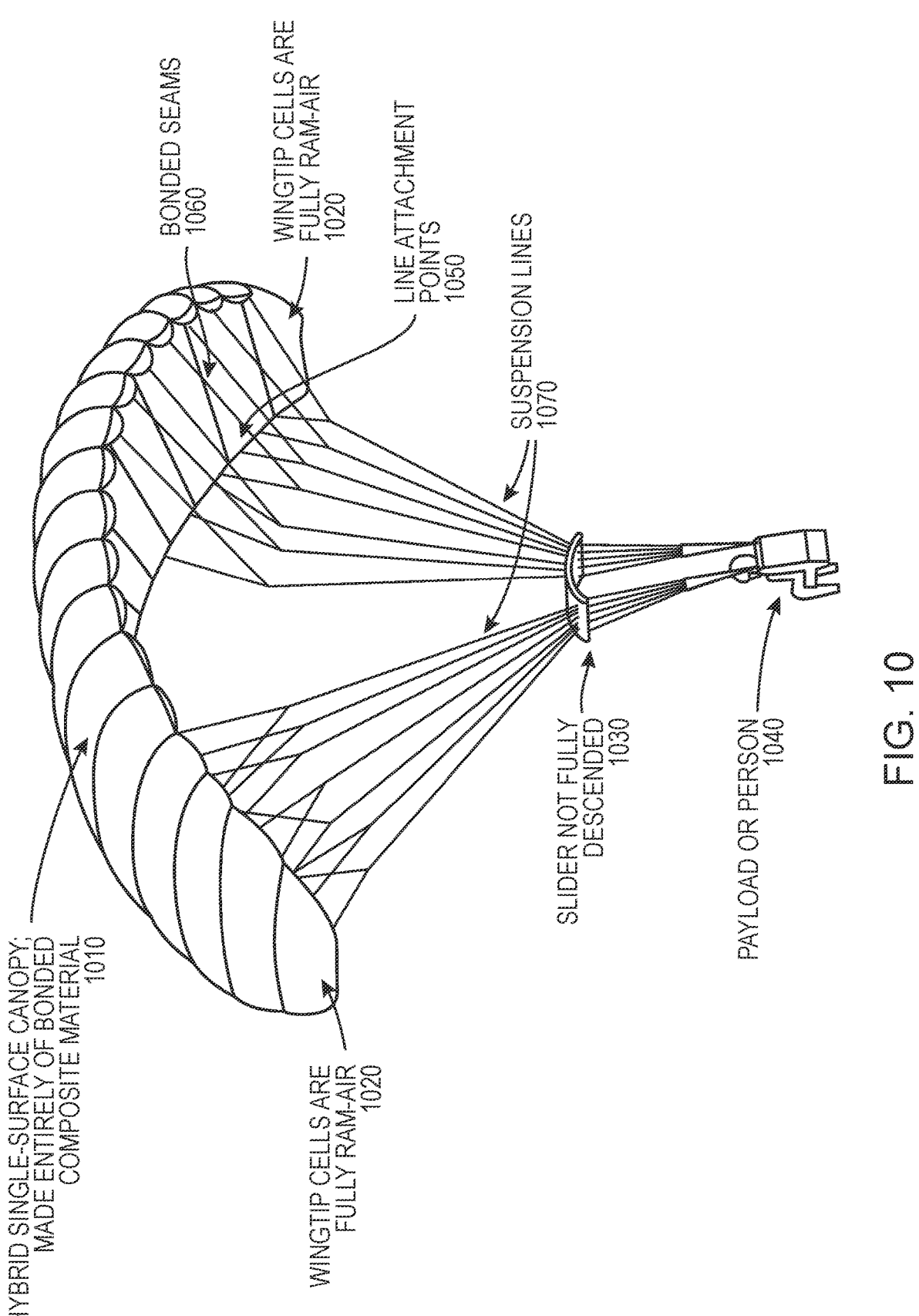
FIG. 10 is an example embodiment of a hybrid single-surface canopy made of bonded composite material, with ram-air wingtip cells, a partially descended slider, a payload/ person, line attachment points, bonded seams, and suspension lines in accordance with an embodiment of the current disclosure.

Refer now to the example embodiment of FIG. 10, which illustrates a parachute with a full composite build canopy according to one or more techniques of the current disclosure. Canopy 1010 is constructed entirely from bonded composite materials. The only sewing on canopy 1010 is in the line attachment points 1050; all seams 1060 in this build are bonded instead of sewn. Additionally significant is that canopy 1010 is a hybrid single-surface canopy. The wingtip cells 1020 are fully ram-air. In this example embodiment, the slider 1030 is not fully descended. Hanging from the other ends of the suspension lines 1070 is a payload or person 1040 for canopy 1010.

Refer now to the example embodiment of FIG. 11, which is an alternative embodiment of a full composite build parachute according to one or more embodiments of the current disclosure. The nose air inlets 1110 allow air to fill the front portion of a partial single-surface canopy. The wingtip cells 1120 at the ends of the canopy are fully ram-air design.

Refer now to the example embodiment of FIG. 12, which illustrates a 3-way folded sewn seam 1210 according to one or more techniques of the present disclosure. This style of seam can be used to construct a hybrid single-surface canopy from woven textiles or nylon. The seam intersects the top surface of the canopy 1220 and can be used where it meets a rib or flare 1230.

Refer now to the example embodiment of FIG. 13*a*, which illustrates an example embodiment of a line attachment method for a composite canopy or a portion of a canopy that is composite. FIG. 13 illustrates a composite fabric with triangular support patch 1310 on each side of a flare. Support tape 1320 made from composite material runs up the center of triangular support patch 1310. Zig-zag stitch 1330 attaches support webbing 1332 to the stack of composite material and outlines stack with wide zig-zag stitching 1330. This support patch 1310 can hold continuous loads of over 200 lbs at the line attachment, with peak loads far beyond that.

Refer now to the example embodiment of FIG. 13*b*, which illustrates a traditional line attachment that would be found on most commercial ram-air canopies. The example embodiment line attachment 1335 of FIG. 13*b* would not work on a composite canopy as it would cause the composite canopy to rip.

Refer now to the example embodiment of FIG. 13*c*, which illustrates a method for creating a line attachment method. Install a bonded support tape on the vertical length of the rib or flare (step 1340) inline with the expected load on the line attachment, on one side only. Install a shape-matching patch on both sides of the bottom of the rib or flare (step 1345). This should also be bonded and not sewn. Sew a strip of webbing or support tape to the bottom of the rib or flare, so that the bottom of the webbing or support tape creates a loop for the line to attach to (step 1350). Note: this sewing should be performed with a very wide zigzag stitch, with a large stitch spacing, to avoid clustering stitches in any concentrated area of the material. Sew the perimeter of the bonded patches (step 1355). This sewing should be performed with a very wide zigzag stitch, with a large stitch spacing, to avoid clustering stitches in any concentrated area of the material. The stitching on the perimeter of the patches is to prevent any slippage of the bonded patches. The stitching on the support tape that makes the line attachment loop transfers the load to the patches and the vertical support tape above it.

Refer now to the example embodiments of FIGS. 14 and 15*a*-15*d*. Parachute 1520 is packed into a deployment bag 1515 with the slider 1510 at the top of the suspension lines 1505 (Step 1410). Parachute 1520, while packed in a deployment bag 1515, is extracted from the parachute container (step 1420). Step 1420 is usually performed by pilot chute 1525 that is supplying the drag required to extract the deployment bag 1515 and parachute 1520. When the deployment sequence reaches the end of the suspension lines 1505, the parachute 1520 is extracted from the deployment bag 1515 (step 1430). Slider 1510 is at the top of the suspension lines 1505, constricting parachute 1520 and slowing down the opening. Slider 1510 with the wingtip extensions allows for positive pressure on the parachute 1520 wingtips during this phase of the opening.

As the system slows down due to the drag of the opening parachute 1520, the drag on the slider 1510 (which is holding the slider up) lessens. When the drag on the slider

1510 is less than the spreading force of the opening parachute 1520, the slider 1510 descends the suspension lines and allows parachute 1520 to fully open and begin flying (step 1440). The grommets in slider 1510 prevent interaction between line groups during the opening and during slider 1510 descent.

Refer now to the example embodiment of FIG. 16 which illustrates composite build bonded seams. FIG. 16 illustrates top surface seam 1610, bottom surface seam 1620, and ram-air/single surface seam 1630. Seams 1610, 1620, and 1630, compared to the sewn builds, are much simpler and stronger. Seams 1610, 1620, and 1630 stress in the shear direction, which is why the top and bottom seams have an additional support tape across the seam. In this embodiment, the additional support tape prevents any peel forces from occurring. In almost all embodiments, composite seams tested out far stronger than sewn seams.

Refer now to the example embodiment of FIG. 17, which illustrates different geometries of flares. In the example embodiment of FIG. 17, the functionality of each flare is to spread the load from the line attachment point across a wider surface area. Hybrid single-surface 1710 has rib 1715, parachute piece 1720, and triangular flares 1725 and 1730 which spread out load across parachute piece 1720. Fully single-surface 1735 has rib 1740, parachute piece 1745 and triangular flares 1750, 1755, and 1760, which spread load across parachute piece 1745. Fully single-surface 1765 has rib 1770 and flares 1775, which spread load across the fully single-surface. Flares 1775 are rounded as they approach the parachute instead of having straighter lines like flare 1750 or 1725. Parachute 1777 has parachute piece 1780 and flares 1785 and 1790, which distribute load across parachute 1777. Flares 1785 and 1790 may not be optimal as in a semi-circle geometry they use more material than either flare 1775 or flare 1750.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. An air deployable parachute comprising:
a top portion of a ram-air parachute comprising a first leading edge and a plurality of seams;
a bottom portion of a ram-air parachute having a second leading edge, wherein the bottom portion extends less than one-third the length of the top portion;
a front portion comprising a plurality of ribs;
a back portion extending beyond the bottom portion and comprising a plurality of flares,
wherein each flare of the plurality of flares of the back portion is attached to a corresponding seam of the plurality of seams of the top portion.

2. The air deployable parachute of claim 1, wherein the top portion and bottom portion comprise a composite fabric.

3. The air deployable parachute of claim 1, wherein each seam of the plurality of seams comprises at least two pieces of fabric that are aligned and held together by adhesives.

4. The air deployable parachute of claim 1, wherein each flare of the plurality of flares is connected to a line at a corresponding line attachment point on the flare.

5. The air deployable parachute of claim 4, wherein each flare of the plurality of flares distributes load from the corresponding line attachment point along the flare at the corresponding seam of the plurality of seams, thereby creating a flat surface along the top portion.

6. The air deployable parachute of claim 3, wherein each seam of the plurality of seams are aligned in a shear direction.

7. The air deployable parachute of claim 4, further comprising wingtip cells.

8. The air deployable parachute of claim 7, wherein one or more suspension lines are placed on each wingtip cell of the wingtip cells.

9. The air deployable parachute of claim 8, further comprising a slider including respective extensions for each wingtip cell of the wingtip cells.

10. The air deployable parachute of claim 9, wherein the slider comprises a pair of openings disposed adjacent to the wingtip cells, each opening being aligned with wingtip extensions.

11. The air deployable parachute of claim 1, further comprising plurality of suspension lines, wherein at least two flares are connected to each suspension line of the plurality of suspension lines.

12. The air deployable parachute of claim 1, wherein the parachute does not have a stiffener and is constructed and configured to be packed into a deployment bag.

* * * * *